(12) United States Patent
Liu

(10) Patent No.: US 10,805,255 B2
(45) Date of Patent: Oct. 13, 2020

(54) NETWORK INFORMATION IDENTIFICATION METHOD AND APPARATUS

(71) Applicant: TENCENT TECHNOLOGY (SHENZHEN) COMPANY LIMITED, Shenzhen, Guangdong (CN)

(72) Inventor: Jie Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 77 days.

(21) Appl. No.: 16/026,786

(22) Filed: Jul. 3, 2018

(65) Prior Publication Data
US 2019/0014071 A1    Jan. 10, 2019

Related U.S. Application Data

(63) Continuation of application No. PCT/CN2017/104275, filed on Sep. 29, 2017.

(30) Foreign Application Priority Data

Oct. 13, 2016 (CN) .......................... 2016 1 0895856
Oct. 27, 2016 (CN) .......................... 2016 1 0956467
Oct. 31, 2016 (CN) .......................... 2016 1 0929276

(51) Int. Cl.
*G06F 15/16* (2006.01)
*H04L 12/58* (2006.01)
(Continued)

(52) U.S. Cl.
CPC ........ *H04L 51/32* (2013.01); *G06F 16/24578* (2019.01); *G06F 40/284* (2020.01);
(Continued)

(58) Field of Classification Search
CPC ... H04L 29/08072; H04L 29/06; H04L 67/42; H04L 67/306
(Continued)

(56) References Cited

U.S. PATENT DOCUMENTS 9,946,871 B2 * 4/2018 Malhotra ................ G06F 21/53
10,097,580 B2 * 10/2018 Aharon ............... H04L 63/1416
(Continued)

FOREIGN PATENT DOCUMENTS

CN      102541899 A     7/2012
CN      103530562 A     1/2014
(Continued)

OTHER PUBLICATIONS

International Search report of PCT/CN2017/104275 filed Nov. 29, 2017.
(Continued)

*Primary Examiner* — Khanh Q Dinh
(74) *Attorney, Agent, or Firm* — Sughrue Mion, PLLC

(57) ABSTRACT

A network information identification method and apparatus are provided. The method includes obtaining network information including comments published on a social network. A first similarity between the network information and trusted network information is calculated, and a second similarity between the network information and non-trusted network information is calculated. Whether the network information is trusted information is determined according to the first similarity and the second similarity. When it is determined that the network information is trusted, the network information is allowed to be displayed on the social network, and when it is determined that the network information is untrusted, the network information is automatically controlled to avoid spreading the comments on the social network.

20 Claims, 22 Drawing Sheets

(51) Int. Cl.
*G06F 40/284* (2020.01)
*G06F 40/289* (2020.01)
*H04L 29/06* (2006.01)
*G06F 16/2457* (2019.01)
*G06F 40/30* (2020.01)

(52) U.S. Cl.
CPC ............ *G06F 40/289* (2020.01); *H04L 51/12* (2013.01); *H04L 67/42* (2013.01); *G06F 40/30* (2020.01)

(58) Field of Classification Search
USPC ................................. 709/220, 224, 226, 228
See application file for complete search history.

(56) References Cited

U.S. PATENT DOCUMENTS

| | | | | |
|---|---|---|---|---|
| 10,510,035 | B2* | 12/2019 | Fadell | G08B 27/003 |
| 10,663,662 | B1* | 5/2020 | Gehl | G02B 6/12033 |
| 2011/0099609 | A1* | 4/2011 | Malhotra | G06F 21/566 |
| | | | | 726/4 |
| 2012/0166307 | A1 | 6/2012 | Pan | |
| 2013/0332539 | A1* | 12/2013 | Christodorescu | G06Q 10/107 |
| | | | | 709/206 |
| 2013/0332541 | A1* | 12/2013 | Christodorescu | H04L 51/12 |
| | | | | 709/206 |
| 2014/0258322 | A1 | 9/2014 | Kim et al. | |
| 2015/0120598 | A1* | 4/2015 | Fadell | G06Q 10/0631 |
| | | | | 705/333 |
| 2015/0127712 | A1* | 5/2015 | Fadell | G08B 25/008 |
| | | | | 709/202 |
| 2016/0065534 | A1* | 3/2016 | Liu | G06F 16/248 |
| | | | | 707/728 |
| 2016/0080525 | A1* | 3/2016 | Ward | G06Q 50/01 |
| | | | | 709/203 |
| 2017/0295202 | A1* | 10/2017 | Aharon | H04L 63/1416 |
| 2018/0184297 | A1* | 6/2018 | Mohamed | H04L 63/0892 |

FOREIGN PATENT DOCUMENTS

| | | |
|---|---|---|
| CN | 103744905 A | 4/2014 |
| CN | 105100119 A | 11/2015 |
| CN | 105335422 A | 2/2016 |
| CN | 105354307 A | 2/2016 |
| CN | 105426706 A | 3/2016 |
| CN | 105426759 A | 3/2016 |
| CN | 105447036 A | 3/2016 |

OTHER PUBLICATIONS

Written Opinion, dated Nov. 29, 2017 from the International Bureau in counterpart International application No. PCT/CN2017/104275.
Communication dated Aug. 13, 2019 from the State Intellectual Property Office of the P.R.C. in application No. 201610895856.9.
Communication dated Jun. 1, 2020, from the State Intellectual Property Office of the P.R. of China in Application No. 201610895856.9.

* cited by examiner

NETWORK INFORMATION IDENTIFICATION METHOD AND APPARATUS

CROSS-REFERENCE TO RELATED APPLICATIONS

This application is a continuation of International Patent Application No. PCT/CN2017/104275, filed on Sep. 29, 2017, which claims priority from Chinese Patent Application No. 201610895856.9 filed on Oct. 13, 2016, from Chinese Patent Application No. 201610956467.2, filed on Oct. 27, 2016, and from Chinese Patent Application No. 201610929276.7, filed on Oct. 31, 2016, all filed in the Chinese Patent Office, the disclosures of each of which are incorporated by reference herein in their entireties.

BACKGROUND

1. Field

This application relates to the field of network applications, and in particular, to a network information identification method and apparatus.

2. Description of Related Art

With the development of network technologies, an increasing amount of information may be spread across networks. Some network information is real and is information including no bad content, but some network information is false information or is information including bad content, such as pornography or horrible information. The development of networks encourages the impact of false information or information including bad content, and ordinary users cannot identify such information due to limited knowledge and information amount.

SUMMARY

It is an aspect to provide a network information identification method and apparatus, which can effectively identify specific information in a network.

According to an aspect of one or more example embodiments, there is provided a method. The method includes obtaining network information including comments published on a social network. A first similarity between the network information and trusted network information is calculated, and a second similarity between the network information and non-trusted network information is calculated. Whether the network information is trusted information is determined according to the first similarity and the second similarity. When it is determined that the network information is trusted, the network information is allowed to be displayed on the social network, and when it is determined that the network information is untrusted, the network information is automatically controlled to avoid spreading the comments on the social network.

According to other aspects of one or more example embodiments, there is also provided an apparatus, other methods, and a computer readable storage medium consistent with the above method.

BRIEF DESCRIPTION OF THE DRAWINGS

Example embodiments are described below with reference to the drawings, in which.

DETAILED DESCRIPTION

The following clearly and completely describes the technical solutions in the embodiments with reference to the accompanying drawings in the embodiments. Obviously, the described embodiments are only some embodiments instead of all embodiments. All other embodiments obtained by a person of ordinary skill in the art based on the embodiments without any creative work fall within the protection scope of this application.

Because the related art technology lacks an automatic information identification mechanism, users can only identify whether network information is trusted by themselves by using their limited knowledge. In many cases, rumors cannot be effectively identified. Therefore, the embodiments provide a network information identification method and apparatus, which can automatically and effectively identify rumors. The network information identification method provided in the embodiments may be implemented in the network information identification apparatus, and the network information identification apparatus may be a background server.

In the embodiments, a background server may automatically obtain to-be-identified network information, and determine whether the to-be-identified network information is trusted according to a similarity between the to-be-identified network information and trusted network information, and a similarity between the to-be-identified network information and non-trusted network information. That is, whether the to-be-identified network information is trusted is determined by using similarities, so as to automatically and effectively identify specific network information such as rumors.

Figure 1:
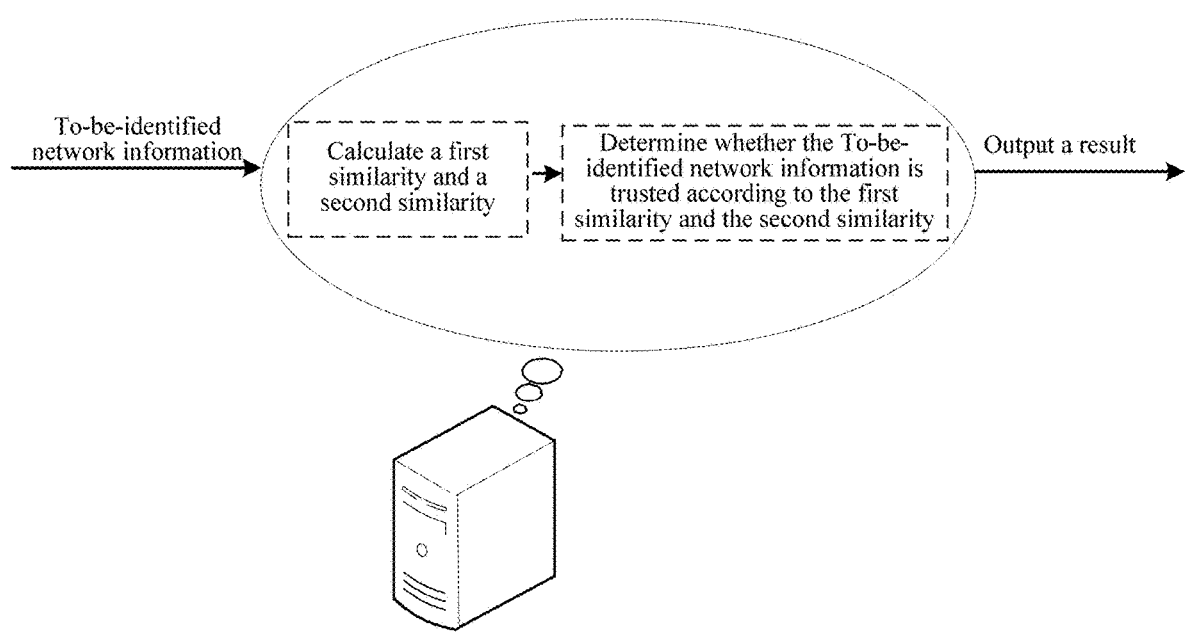
FIG. 1 is a schematic scenario diagram of a network information identification method according to an embodiment.

A specific implementation scenario of the network information identification method of the embodiments may be shown in FIG. 1. A server obtains to-be-identified network information, where the to-be-identified network information may be information or comments published on a social network (such as Weibo or QZone) by a user, then calculates a similarity between the to-be-identified network information and trusted network information (network information in a trusted database) as a first similarity, and calculates a similarity between the to-be-identified network information and non-trusted network information (network information in a non-trusted database) as a second similarity, determines whether the to-be-identified network information is trusted according to the first similarity and the second similarity, and then outputs an identification result. When determining that the to-be-identified network information is non-trusted, the server may automatically block the to-be-identified network information, to prevent rumors from spreading continuously, or automatically mark the to-be-identified network information to be suspicious, to prompt the user. That is, in the embodiments, whether the to-be-identified network information is trusted is determined by using similarities, so as to automatically and effectively identify rumors.

The following separately provides detailed descriptions, and it should be noted that, sequence numbers of the following embodiments are not used as limitations to the sequence of the embodiments.

Embodiment 1

Figure 2:
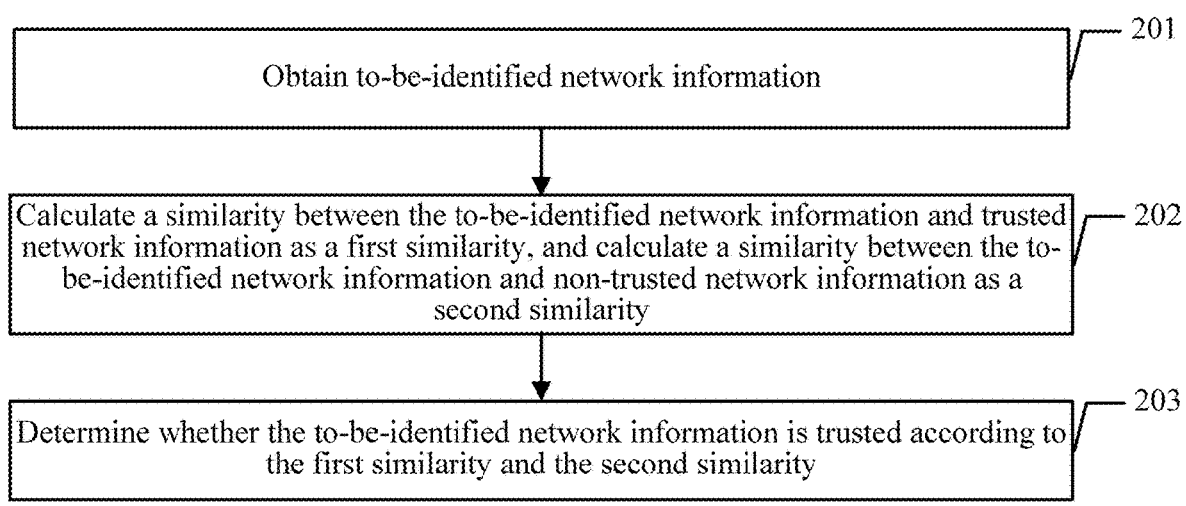
FIG. 2 is a schematic flowchart of a network information identification method according to an embodiment.

As shown in FIG. 2, a method of this embodiment includes the following steps:

Step 201. Obtain to-be-identified network information.

In a specific implementation, the to-be-identified network information may be information or comments published on a social network (such as Weibo or Qzone) by a user. When a user publishes information or comments on a social network by using a terminal (such as a mobile phone, a tablet computer, or a personal computer), a background server may obtain the information or comments published by the user, that is, obtain to-be-identified network information.

Step 202. Calculate a similarity between the to-be-identified network information and trusted network information as a first similarity, and calculate a similarity between the to-be-identified network information and non-trusted network information as a second similarity.

In a specific implementation, trusted network information and non-trusted network information may be collected in advance, a trusted database is established according to the collected trusted network information, and a non-trusted database is established according to the collected non-trusted network information.

The trusted network information may be extracted from an authoritative or trusted website, such as Baidupedia or Wikipedia. Therefore, network information included in the trusted database may be regarded to be trusted. The non-trusted network information may be manually collected at present, and network information included in the non-trusted database may be regarded to be untrusted.

Specifically, similarities between the to-be-identified network information and all trusted network information in the trusted database may be calculated by using a cosine law algorithm. Multiple similarity values may be obtained herein. A larger similarity value obtained through calculation indicates a higher similarity between two pieces of information. In this step, a maximum value of the similarities obtained through calculation may be recorded as the first similarity. That is, the first similarity is a similarity between the to-be-identified network information and trusted network information that is in the trusted database and that has the highest similarity with the to-be-identified network information.

Likewise, similarities between the to-be-identified network information and all non-trusted network information in the non-trusted database may be calculated by using the cosine law algorithm. Multiple similarity values may be obtained herein. A larger similarity value obtained through calculation indicates a higher similarity between two pieces of information. In this step, a maximum value of the similarities obtained through calculation may be recorded as the second similarity. That is, the second similarity is a similarity between the to-be-identified network information and non-trusted network information that is in the non-trusted database and that has the highest similarity with the to-be-identified network information.

In the foregoing described method, similarities between large amounts of information need to be calculated, and practice has proven that a calculation speed of the cosine law algorithm is better than that of another algorithm. Therefore, in this embodiment, a similarity between two pieces of information may be calculated by using the cosine law algorithm. Certainly, in addition to the cosine law algorithm, other algorithms such as a distance editing algorithm may also be used to calculate the similarity between two pieces of information. Specific algorithms used are not limited herein.

In addition, in the foregoing described method, the first similarity and the second similarity are obtained by calculating similarities between the to-be-identified network information and all network information in the trusted database and the non-trusted database piece by piece. In reality, the first similarity and the second similarity may also be obtained in other manners. For example, a keyword extraction method is used to extract trusted network information having a same keyword with the to-be-identified network information from the trusted database, and calculate a similarity between the trusted network information and the to-be-identified network information as a first similarity; and extract non-trusted network information having a same keyword with the to-be-identified network information from the non-trusted database, and calculate a similarity between the non-trusted network information and the to-be-identified network information as a second similarity.

Step 203. Determine whether the to-be-identified network information is trusted according to the first similarity and the second similarity.

Specifically, the first similarity and the second similarity may be compared. When the first similarity is greater than the second similarity, it indicates that the similarity between the to-be-identified network information and the trusted network information is higher than the similarity between the to-be-identified network information and the non-trusted network information. Therefore, it may be determined that the to-be-identified network information is trusted. When the second similarity is greater than the first similarity, it indicates that the similarity between the to-be-identified network information and the non-trusted network information is higher than the similarity between the to-be-identified network information and the trusted network information. Therefore, it may be determined that the to-be-identified network information is untrusted.

The foregoing identification method uses both the trusted database and the non-trusted database. In reality, one of the two databases may also be used independently to identify whether the network information is trusted. For example, only the trusted database is used to obtain the first similarity through calculation by using the cosine law algorithm, and determine whether the first similarity is greater than a first preset threshold (such as 0.8). If the first similarity is greater than the first preset threshold, it is regarded that the to-be-identified network information is trusted, and if the first similarity is not greater than the first preset threshold, it is regarded that the to-be-identified network information is untrusted. Alternatively, only the non-trusted database is used to obtain the second similarity through calculation by using the cosine law algorithm, and determine whether the second similarity is greater than a second preset threshold (such as 0.9). If the second similarity is greater than the second preset threshold, it is regarded that the to-be-identified network information is untrusted, and if the second similarity is not greater than the second preset threshold, it is regarded that the to-be-identified network information is trusted.

When it is determined that the to-be-identified network information is trusted, the to-be-identified network information may be allowed to be displayed on the social network; and when it is determined that the to-be-identified network information is untrusted, some processing measures may be used to automatically prompt other users or to automatically avoid spreading of rumors. For example, the to-be-identified network information may be automatically marked to be suspicious, or the to-be-identified network information may be automatically blocked.

In this embodiment, a background server may automatically obtain to-be-identified network information, and determine whether the to-be-identified network information is trusted according to a similarity between the to-be-identified network information and trusted network information, and a similarity between the to-be-identified network information and non-trusted network information. That is, whether the to-be-identified network information is trusted is determined by using similarities, so as to automatically and effectively identify rumors.

Embodiment 2

Figure 3:
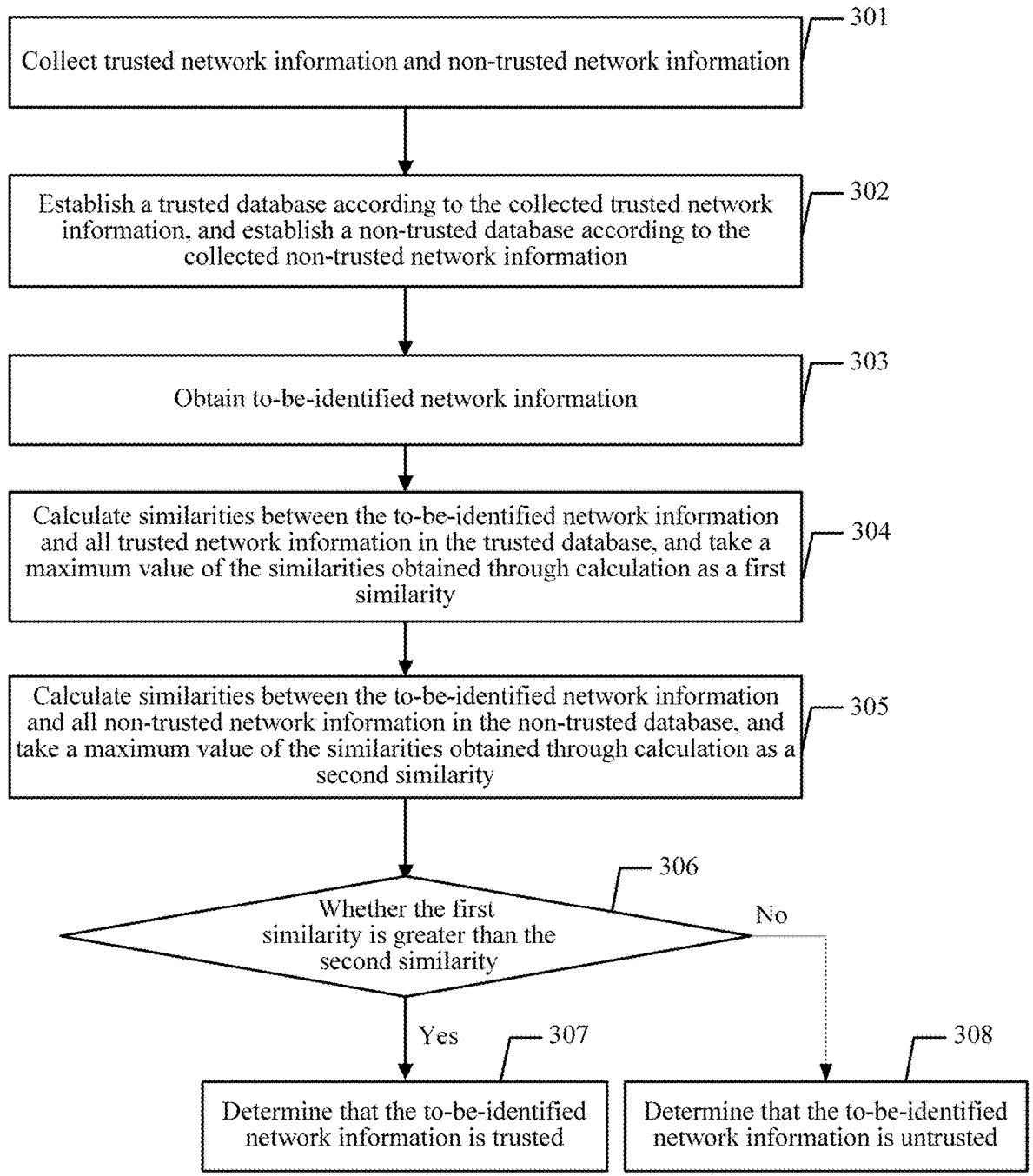
FIG. 3 is another schematic flowchart of a network information identification method according to an embodiment.

The method described in Embodiment 1 is further described in detail by using an example in this embodiment. As shown in FIG. 3, a method of this embodiment includes:

Step 301. Collect trusted network information and non-trusted network information.

The trusted network information may be extracted from an authoritative or trusted website, such as Baidupedia or Wikipedia. The non-trusted network information may be manually collected at present.

Step 302. Establish a trusted database according to the collected trusted network information, and establish a non-trusted database according to the collected non-trusted network information.

The trusted database includes multiple pieces of trusted network information, and network information included in the trusted database may be regarded to be trusted. The non-trusted database includes multiple pieces of non-trusted network information, and network information included in the non-trusted database may be regarded to be non-trusted.

Step 303. Obtain to-be-identified network information.

In a specific implementation, the to-be-identified network information may be information or comments published on a social network (such as Weibo or Qzone) by a user. When a user publishes information or comments on a social network by using a terminal (such as a mobile phone, a tablet computer, or a personal computer), a background server may obtain the information or comments published by the user, that is, obtain to-be-identified network information.

Step 304. Calculate similarities between the to-be-identified network information and all trusted network information in the trusted database, and take a maximum value of the similarities obtained through calculation as a first similarity.

Specifically, the similarities between the to-be-identified network information and all trusted network information in the trusted database may be calculated by using a cosine law algorithm. Multiple similarity values may be obtained herein. A larger similarity value obtained through calculation indicates a higher similarity between two pieces of information. In this step, a maximum value of the similarities obtained through calculation may be recorded as the first similarity. That is, the first similarity is a similarity between the to-be-identified network information and trusted network information that is in the trusted database and that has the highest similarity with the to-be-identified network information.

Step 305. Calculate similarities between the to-be-identified network information and all non-trusted network information in the non-trusted database, and take a maximum value of the similarities obtained through calculation as a second similarity.

Likewise, the similarities between the to-be-identified network information and all non-trusted network information in the non-trusted database may be calculated by using the cosine law algorithm. Multiple similarity values may be obtained herein. A larger similarity value obtained through calculation indicates a higher similarity between two pieces of information. In this step, a maximum value of the similarities obtained through calculation may be recorded as the second similarity. That is, the second similarity is a similarity between the to-be-identified network information and non-trusted network information that is in the non-trusted database and that has the highest similarity with the to-be-identified network information.

The following uses an example to describe the process of calculating a similarity between two pieces of information by using the cosine law algorithm:

Information 1. Zhang San is a singer, and is also an actor.
Information 2. Zhang San is not an actor, but is a singer.
First step. Segment words.
Information 1. ZhangSan/is/a/singer, and also/is/an/actor.
Information 2. ZhangSan/is/not/an/actor, but/is/a/singer.
Second step. Remove repetitions, and list all identified words:

ZhangSan, is, not, a, actor, singer, but, and also

Third step. Calculate word frequencies (representing the quantity of occurrence times of a word in one piece of information herein).

Information 1: Zhang San 1, is 2, not 0, a 2, actor 1, singer 1, but 0, also 1.
Information 2: Zhang San 1, is 2, not 1, a 2, actor 1, singer 1, but 1, also 0.
Fourth step. Construct word frequency vectors.
Information 1: [1, 2, 0, 2, 1, 1, 0, 1]
Information 2: [1, 2, 1, 2, 1, 1, 0, 1]

The foregoing constructs two multidimensional vectors, and the value of each dimension is the word frequency. After the foregoing two multidimensional vectors are constructed, calculating a similarity between two pieces of information becomes calculating a similarity between two vectors. It is well-known that the similarity between two vectors may be represented by an included angle θ of the vectors, and specifically, may be represented by a cosine value of an included angle of two vectors. If the cosine value is closer to 1, it indicates that the included angle is closer to 0 degree, which means that the two vectors are more similar. This is "cosine similarity".

Fifth step. Calculate a cosine value of an included angle of the two vectors.

$$\cos\theta = (1*1+2*2+0*1+2*2+1*1+1*1+0*0+1*1)/(\text{sqrt}(1^2+2^2+0^2+2^2+1^2+1^2+0^2+1^2)*\text{sqrt}(1^2+2^2+1^2+2^2+1^2+1^2+0^2+1^2))$$

Cos θ≈0.961 is obtained finally through calculation.

That is, the similarity between the two pieces of information is 0.961. If the similarity value is closer to 1, the similarity is higher.

It should be noted that, in reality, step 304 and step 305 may also be implemented in no particular order.

In the foregoing described method, similarities between large amounts of information need to be calculated, and practice has proven that a calculation speed of the cosine law algorithm is better than that of another algorithm. Therefore, in this embodiment, a similarity between two pieces of information may be calculated by using the cosine law algorithm. Certainly, in addition to the cosine law algorithm, other algorithms such as a distance editing algorithm may also be used to calculate the similarity between two pieces of information. Specific algorithms used are not limited herein.

In addition, in the method described in step 304 and step 305, the first similarity and the second similarity are obtained by calculating similarities between the to-be-identified network information and all network information in the trusted database and the non-trusted database piece by piece. In reality, the first similarity and the second similarity may also be obtained in other manners. For example, a keyword extraction method is used to extract trusted network information having a same keyword with the to-be-identified network information from the trusted database, and calculate a similarity between the trusted network information and the to-be-identified network information as a first similarity; and extract non-trusted network information having a same keyword with the to-be-identified network information from the non-trusted database, and calculate a similarity between the non-trusted network information and the to-be-identified network information as a second similarity.

Step 306. Determine whether the first similarity is greater than the second similarity, if the first similarity is greater than the second similarity, perform step 307, and if the first similarity is less than the second similarity, perform step 308.

Specifically, the first similarity and the second similarity may be compared. When the first similarity is greater than the second similarity, it indicates that the similarity between the to-be-identified network information and the trusted network information is higher than the similarity between the to-be-identified network information and the non-trusted network information. Therefore, it may be determined that the to-be-identified network information is trusted. When the second similarity is greater than the first similarity, it indicates that the similarity between the to-be-identified network information and the non-trusted network information is higher than the similarity between the to-be-identified network information and the trusted network information. Therefore, it may be determined that the to-be-identified network information is untrusted.

Step 307. Determine that the to-be-identified network information is trusted.

Step 308. Determine that the to-be-identified network information is untrusted.

When it is determined that the to-be-identified network information is trusted, the to-be-identified network information may be allowed to be displayed on the social network; and when it is determined that the to-be-identified network information is untrusted, some processing measures may be used to prompt other users or avoid spreading of rumors. For example, the to-be-identified network information may be marked to be suspicious, or the to-be-identified network information may be blocked.

The foregoing identification method uses both the trusted database and the non-trusted database. In reality, one of the two databases may also be used independently to identify whether the network information is trusted. For example, only the trusted database is used to obtain the first similarity through calculation by using the cosine law algorithm, and determine whether the first similarity is greater than a first preset threshold (such as 0.8). If the first similarity is greater than the first preset threshold, it is regarded that the to-be-identified network information is trusted, and if the first similarity is not greater than the first preset threshold, it is regarded that the to-be-identified network information is untrusted. Alternatively, only the non-trusted database is used to obtain the second similarity through calculation by using the cosine law algorithm, and determine whether the second similarity is greater than a second preset threshold (such as 0.9). If the second similarity is greater than the second preset threshold, it is regarded that the to-be-identified network information is untrusted, and if the second similarity is not greater than the second preset threshold, it is regarded that the to-be-identified network information is trusted.

In this embodiment, a background server may automatically obtain to-be-identified network information, and determine whether the to-be-identified network information is trusted according to a similarity between the to-be-identified network information and trusted network information, and a similarity between the to-be-identified network information and non-trusted network information. That is, whether the to-be-identified network information is trusted is determined by using similarities, so as to automatically and effectively identify rumors.

Embodiment 3

Figure 4:
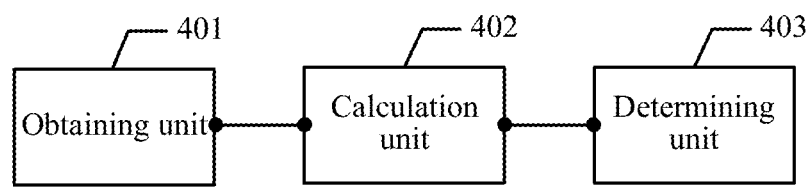
FIG. 4 is a schematic structural diagram of a network information identification apparatus according to an embodiment.

To better implement the foregoing method, this embodiment further provides a network information identification apparatus. As shown in FIG. 4, the apparatus of this embodiment includes: an obtaining unit 401, a calculation unit 402, and a determining unit 403, as follows (1) Obtaining Unit 401

The obtaining unit 401 is configured to obtain to-be-identified network information.

In a specific implementation, the to-be-identified network information may be information or comments published on a social network (such as Weibo or Qzone) by a user. When a user publishes information or comments on a social network by using a terminal (such as a mobile phone, a tablet computer, or a personal computer), the obtaining unit 401 may obtain the information or comments published by the user, that is, obtain to-be-identified network information.

(2) Calculation Unit 402

The calculation unit 402 is configured to calculate a similarity between the to-be-identified network information and trusted network information as a first similarity, and calculate a similarity between the to-be-identified network information and non-trusted network information as a second similarity.

In a specific implementation, the network information identification apparatus of this embodiment may further include a collecting unit and an establishing unit.

The collecting unit may collect trusted network information and non-trusted network information in advance, and the establishing unit may establish a trusted database according to the collected trusted network information, and establish a non-trusted database according to the collected non-trusted network information.

The trusted network information may be extracted from an authoritative or trusted website, such as Baidupedia or Wikipedia. Therefore, network information included in the trusted database may be regarded to be trusted. The non-trusted network information may be manually collected at present, and network information included in the non-trusted database may be regarded to be entrusted.

Specifically, the calculation unit 402 may include a first calculation subunit and a second calculation subunit.

The first calculation subunit may calculate similarities between the to-be-identified network information and all trusted network information in the trusted database by using a cosine law algorithm. Multiple similarity values may be obtained herein. A larger similarity value obtained through calculation indicates a higher similarity between two pieces of information. In this step, the first calculation subunit may record a maximum value of the similarities obtained through calculation as the first similarity. That is, the first similarity is a similarity between the to-be-identified network information and trusted network information that is in the trusted database and that has the highest similarity with the to-be-identified network information.

Likewise, the second calculation subunit may also calculate similarities between the to-be-identified network information and all non-trusted network information in the non-trusted database by using the cosine law algorithm. Multiple similarity values may be obtained herein. A larger similarity value obtained through calculation indicates a higher similarity between two pieces of information. In this step, the second calculation subunit may record a maximum value of the similarities obtained through calculation as the second similarity. That is, the second similarity is a similarity between the to-be-identified network information and non-trusted network information that is in the non-trusted database and that has the highest similarity with the to-be-identified network information.

In the foregoing described method, similarities between large amounts of information need to be calculated, and practice has proven that a calculation speed of the cosine law algorithm is better than that of another algorithm. Therefore, in this embodiment, the first calculation subunit and the second calculation subunit may calculate a similarity between two pieces of information by using the cosine law algorithm. Certainly, in addition to the cosine law algorithm, other algorithms such as a distance editing algorithm may also be used to calculate the similarity between two pieces of information. Specific algorithms used are not limited herein.

In addition, in the foregoing described method, the first similarity and the second similarity are obtained by calculating similarities between the to-be-identified network information and all network information in the trusted database and the non-trusted database piece by piece. In reality, the first similarity and the second similarity may also be obtained in other manners. For example, a keyword extraction method is used to extract trusted network information having a same keyword with the to-be-identified network information from the trusted database, and calculate a similarity between the trusted network information and the to-be-identified network information as a first similarity; and extract non-trusted network information having a same keyword with the to-be-identified network information from the non-trusted database, and calculate a similarity between the non-trusted network information and the to-be-identified network information as a second similarity.

(3) Determining Unit 403

The determining unit 403 is configured to determine whether the to-be-identified network information is trusted according to the first similarity and the second similarity.

Specifically, the determining unit 403 may include a comparison subunit, a first determining subunit, and a second determining subunit.

The comparison subunit may compare the first similarity and the second similarity. When the first similarity is greater than the second similarity, it indicates that the similarity between the to-be-identified network information and the trusted network information is higher than the similarity between the to-be-identified network information and the non-trusted network information. Therefore, the first determining subunit may determine that the to-be-identified network information is trusted. When the second similarity is greater than the first similarity, it indicates that the similarity between the to-be-identified network information and the non-trusted network information is higher than the similarity between the to-be-identified network information and the trusted network information. Therefore, the second determining subunit may determine that the to-be-identified network information is untrusted.

The foregoing identification method uses both the trusted database and the non-trusted database. In reality, one of the two databases may also be used independently to identify whether the network information is trusted. For example, only the trusted database is used to obtain the first similarity through calculation by using the cosine law algorithm, and determine whether the first similarity is greater than a first preset threshold (such as 0.8). If the first similarity is greater than the first preset threshold, it is regarded that the to-be-identified network information is trusted, and if the first similarity is not greater than the first preset threshold, it is regarded that the to-be-identified network information is untrusted. Alternatively, only the non-trusted database is used to obtain the second similarity through calculation by using the cosine law algorithm, and determine whether the second similarity is greater than a second preset threshold (such as 0.9). If the second similarity is greater than the second preset threshold, it is regarded that the to-be-identified network information is untrusted, and if the second similarity is not greater than the second preset threshold, it is regarded that the to-be-identified network information is trusted.

In addition, the network information identification apparatus of this embodiment may further include a processing unit. When it is determined that the to-be-identified network information is trusted, the processing unit may allow the to-be-identified network information to be displayed on the social network; and when it is determined that the to-be-identified network information is untrusted, the processing unit may use some processing measures to prompt other users or avoid spreading of rumors. For example, the processing unit may mark the to-be-identified network information to be suspicious, or block the to-be-identified network information.

It should be noted that, when the network information identification apparatus provided in the foregoing embodiment identifies network information, it is illustrated with an example of division of the foregoing function modules. In practical application, the foregoing functions may be distributed to different function modules according to requirements, that is, the internal structure of the device is divided into different function modules, so as to finish all or part of the functions described above. In addition, the network information identification apparatus provided in the foregoing embodiment and the network information identification method belong to one concept. For specific implementation processes, refer to the method embodiments, and details are not described herein again.

In this embodiment, the obtaining unit may automatically obtain to-be-identified network information, the calculation unit determines a similarity between the to-be-identified network information and trusted network information, and determines a similarity between the to-be-identified network information and non-trusted network information, and the determining unit determines whether the to-be-identified network information is trusted according to the calculated similarities. That is, in this embodiment, whether the to-be-identified network information is trusted is determined by using similarities, so as to automatically and effectively identify rumors.

Figure 5:
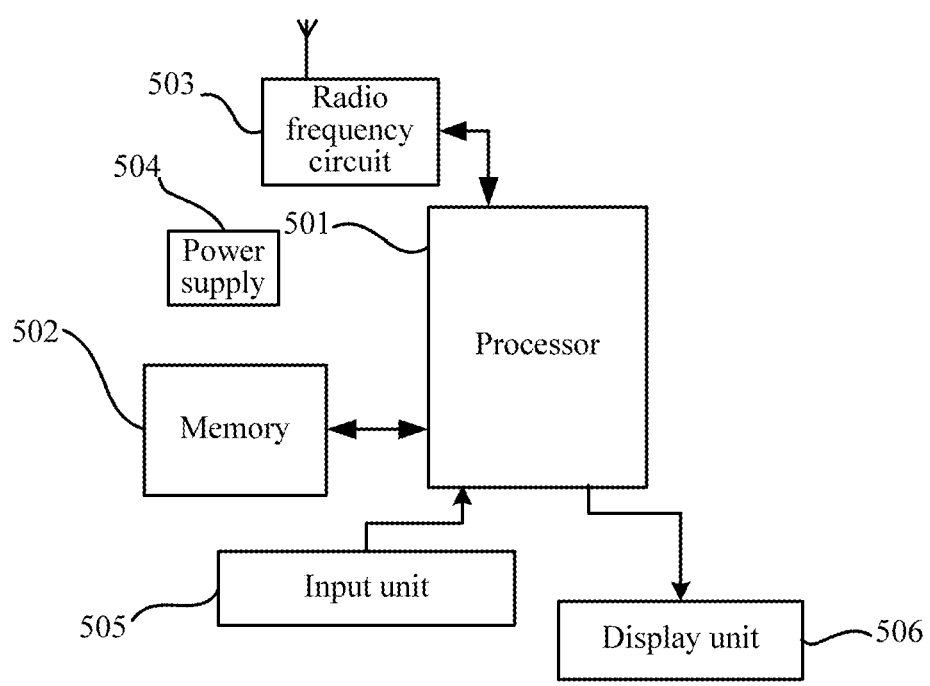
FIG. 5 is another schematic structural diagram of a network information identification apparatus according to an embodiment.

This embodiment further provides a network information identification apparatus. As shown in FIG. 5, FIG. 5 shows a schematic structural diagram of the apparatus involved in this embodiment. Specifically:

The apparatus may include components such as a processor 501 including one or more processing cores, a memory 502 including one or more computer readable storage media, a radio frequency (RF) circuit 503, a power supply 504, an input unit 505, and a display unit 506. A person skilled in the art may understand that the structure of the apparatus shown in FIG. 5 does not constitute a limitation to the apparatus, and the apparatus may include more or fewer components than those shown in the figure, or some components may be combined, or a different component deployment may be used.

The processor 501 is a control center of the apparatus, which is connected to various parts of the entire apparatus by using various interfaces and lines, and by running or executing a software program and/or module stored in the memory 502 and calling data stored in the memory 502, to perform various functions of the apparatus and process data, so as to perform overall monitoring on the apparatus. The processor 501 may include the one or more processing cores. The processor 501 may integrate an application processor and a modem. The application processor mainly processes an operating system, a user interface, an application program, and the like. The modem mainly processes wireless communication. It may be understood that the foregoing modem processor may alternatively not be integrated into the processor 501.

The memory 502 may be configured to store a software program and a module. The processor 501 runs the software program and the module stored in the memory 502, to implement various functional applications and data processing. The memory 502 may mainly include a program storage area and a data storage area. The program storage area may store an operating system, an application program required by at least one function (such as a sound playing function and an image display function), and the like. The data storage area may store data created according to use of the apparatus, and the like. In addition, the memory 502 may include a high speed random access memory, and may further include a nonvolatile memory, such as at least one magnetic disk storage device, a flash memory, or other volatile solid-state storage devices. Correspondingly, the memory 502 may further include a memory controller, to provide access of the processor 501 to the memory 502.

The RF circuit 503 may be configured to receive and send a signal during information transmission and receiving. Especially, the RF circuit 503 sends, after receiving downlink information of a base station, the information to one or more processors 501 for processing, and sends involved uplink data to the base station. Generally, the RF circuit 503 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 503 may also communicate with a network and another device by wireless communication. The wireless communication may use any communications standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Message Service (SMS), and the like.

The apparatus further includes the power supply 504 (such as a battery) for supplying power to the components. The power supply 504 may be logically connected to the processor 501 by using a power management system, thereby implementing functions such as charging, discharging and power consumption management by using the power management system. The power supply 504 may further include one or more of a direct current or alternating current power supply, a re-charging system, a power failure detection circuit, a power supply converter or inverter, a power supply state indicator, and any other components.

The apparatus may further include the input unit 505. The input unit 505 may be configured to receive entered numeric or character information and generate keyboard, mouse, joystick, optical, or trackball signal input related to user settings and function control. Specifically, in a specific embodiment, the input unit 505 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. The touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 501. Moreover, the touch controller can receive and execute a command sent by the processor 501. In addition, the touch-sensitive surface may be implemented in multiple types, such as a resistive type, a capacitive type, an infrared type, and a surface acoustic wave type. In addition to the touch-sensitive surface, the input unit 505 may further include another input device. Specifically, the another input device may include but is not limited to one or more of a physical keyboard, a function key (for example, a volume control key or a power on/off key), a trackball, a mouse, or a joystick.

The apparatus may further include the display unit 506. The display unit 506 may be configured to display information entered by the user or information provided to the user, and graphical user interfaces of the apparatus. The graphical user interfaces each may include an image, text, an icon, a video, or any combination thereof. The display unit 506 may include a display panel. The display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfer the touch operation to the processor 501 to determine a type of a touch event, and then the processor 501 provides corresponding visual output on the display panel according to the type of the touch event. Although in FIG. 5, the touch-sensitive surface and the display panel are used as two separate parts to implement input and output functions, in some embodiments, the touch-sensitive surface and the display panel may be integrated to implement the input and output functions.

Although not shown in the figure, the apparatus may further include a camera, a Bluetooth module, and the like, which are not further described herein. Specifically, in this embodiment, the processor 501 of the apparatus may load, according to the following instructions, executable files corresponding to processes of one or more application programs into the memory 502. The processor 501 runs the application programs stored in the memory 502, to implement various functions:

obtaining to-be-identified network information; calculating a similarity between the to-be-identified network information and trusted network information as a first similarity, and calculating a similarity between the to-be-identified network information and non-trusted network information as a second similarity; and determining whether the to-be-identified network information is trusted according to the first similarity and the second similarity.

Specifically, the processor 501 may calculate the similarity between the to-be-identified network information and the trusted network information by using a cosine law algorithm, as the first similarity, and calculate the similarity between the to-be-identified network information and the non-trusted network information by using the cosine law algorithm, as the second similarity.

Further, the processor 501 is further configured to:

collect trusted network information and non-trusted network information before obtaining the to-be-identified network information; and establish a trusted database according to the collected trusted network information, and establish a non-trusted database according to the collected non-trusted network information.

Specifically, the processor 501 may calculate similarities between the to-be-identified network information and all trusted network information in the trusted database, and take a maximum value of the similarities obtained through calculation, as the first similarity; and calculate similarities between the to-be-identified network information and all non-trusted network information in the non-trusted database, and take a maximum value of the similarities obtained through calculation, as the second similarity.

Specifically, the processor 501 may determine whether the to-be-identified network information is trusted according to the following manners:

comparing the first similarity and the second similarity;

determining that the to-be-identified network information is trusted when the first similarity is greater than the second similarity; and determining that the to-be-identified network information is untrusted when the second similarity is greater than the first similarity.

Further, when it is determined that the to-be-identified network information is untrusted, the processor 501 may further mark the to-be-identified network information to be suspicious, or block the to-be-identified network information.

It can be known from the foregoing that, the apparatus of this embodiment may automatically obtain to-be-identified network information, then determine a similarity between the to-be-identified network information and trusted network information, and determine a similarity between the to-be-identified network information and non-trusted network information, and finally determine whether the to-be-identified network information is trusted according to the calculated similarities. That is, the apparatus of this embodiment may determine whether the to-be-identified network information is trusted by using similarities, so as to automatically and effectively identify rumors.

In the several embodiments provided in this application, it should be understood that the disclosed system, apparatus, and method may be implemented in other manners. For example, the foregoing described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms. The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit. If implemented in the form of software functional units and sold or used as an independent product, the integrated units may also be stored in a computer-readable storage medium. Based on such an understanding, the technical solutions of the embodiments essentially, or the part contributing to the prior art, or all or some of the technical solutions may be implemented in a form of a software product. The computer software product is stored in a storage medium and includes several instructions for instructing a computer device (which may be a personal computer, an apparatus, a network device, or the like) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

This embodiment provides a social network information identification method. It should be noted that, steps shown in the flowcharts of the accompanying drawings may be performed in a computer system of a group of computer executable instructions, and although the flowcharts show the logical sequence, in some cases, the shown or described step different from the sequence herein may be performed.

Figure 6:
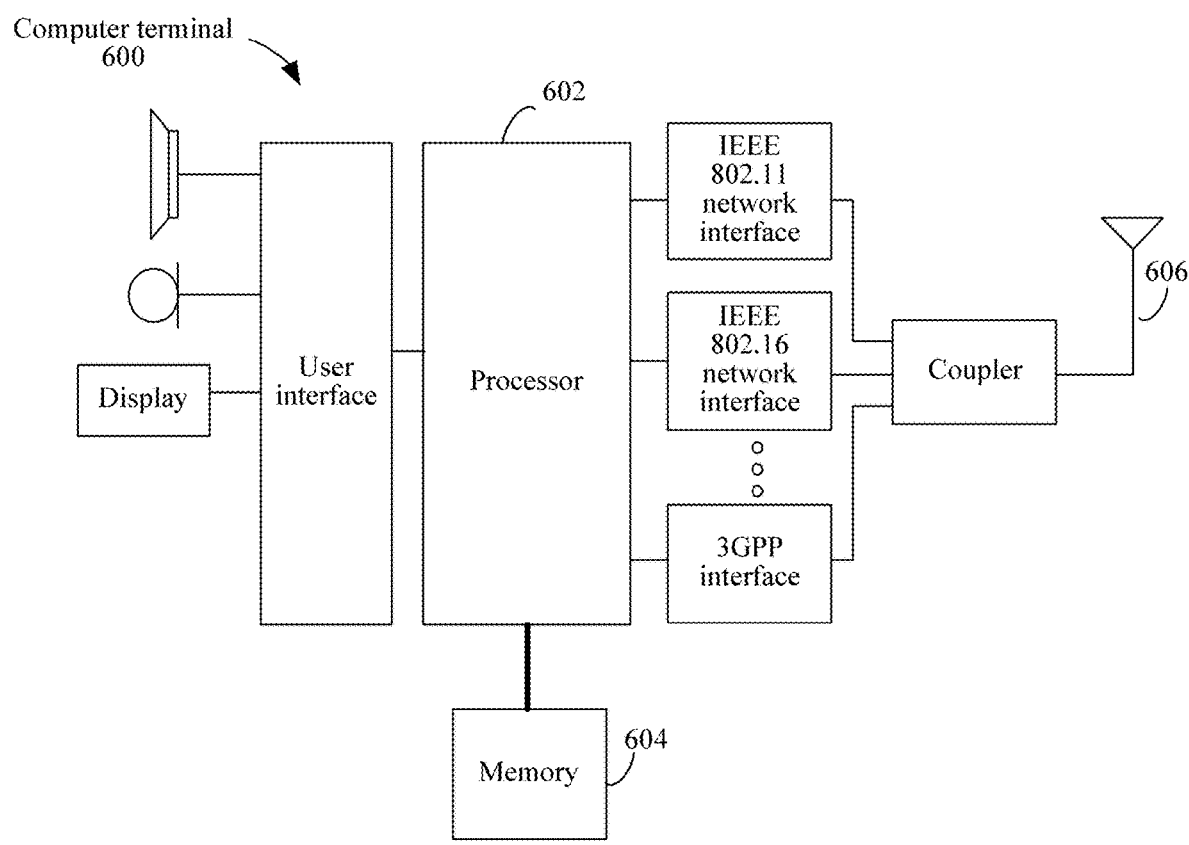
FIG. 6 is a block diagram of a hardware structure of a computer terminal that may be used to implement a social network information identification method according to an embodiment.

The method embodiment provided in this application may be performed in a mobile terminal, a computer terminal, or a similar operational apparatus. That the method is running in a computer terminal is used as an example. FIG. 6 is a block diagram of a hardware structure of a computer terminal that may be used to implement the social network information identification method according to this embodiment. As shown in FIG. 6, the computer terminal 600 may include one or more (only one is shown in the figure) processors 602 (the processor 602 may include but not limited to a processing apparatus such as a microprocessor MCU or a programmable logic device FPGA), a memory 604 used to store data, and a transmission apparatus 606 used for a communication function. It may be understood by a person of ordinary skill in the art that the structure shown in FIG. 6 is merely illustrative instead of limiting a structure of the foregoing electronic apparatus. For example, the computer terminal 600 may also include more or fewer components than those shown in FIG. 6, or have a configuration different from that shown in FIG. 6.

The memory 604 may be configured to store a software program of application software and a module, for example, a program instruction/module corresponding to the social network information identification method in this embodiment, and the processor 602 performs various functional applications and data processing by running a software program and a module stored in the memory 604, that is, implementing the foregoing social network information identification method. The memory 604 may include a high-speed random memory, and may also include a non-volatile memory such as one or more magnetic storage devices, a flash memory, or another nonvolatile solid-state memory. In some instances, the memory 604 may further include memories remotely disposed relative to the processor 602, and these remote memories may be connected to the computer terminal 10 through a network. Instances of the network include, but are not limited to, the Internet, an intranet, a local area network, a mobile communications network, and a combination thereof.

The transmission apparatus 606 is configured to receive or send data through a network. Specific instances of the network may include a wireless network provided by a communications provider of the computer terminal 600. In an example, the transmission apparatus 606 includes a network interface controller (NIC) that may be connected to another network device by using a base station, thereby communicating with the Internet. In an instance, the transmission apparatus 606 may be an RF module that is configured to communicate with the Internet in a wireless manner.

Figure 7:
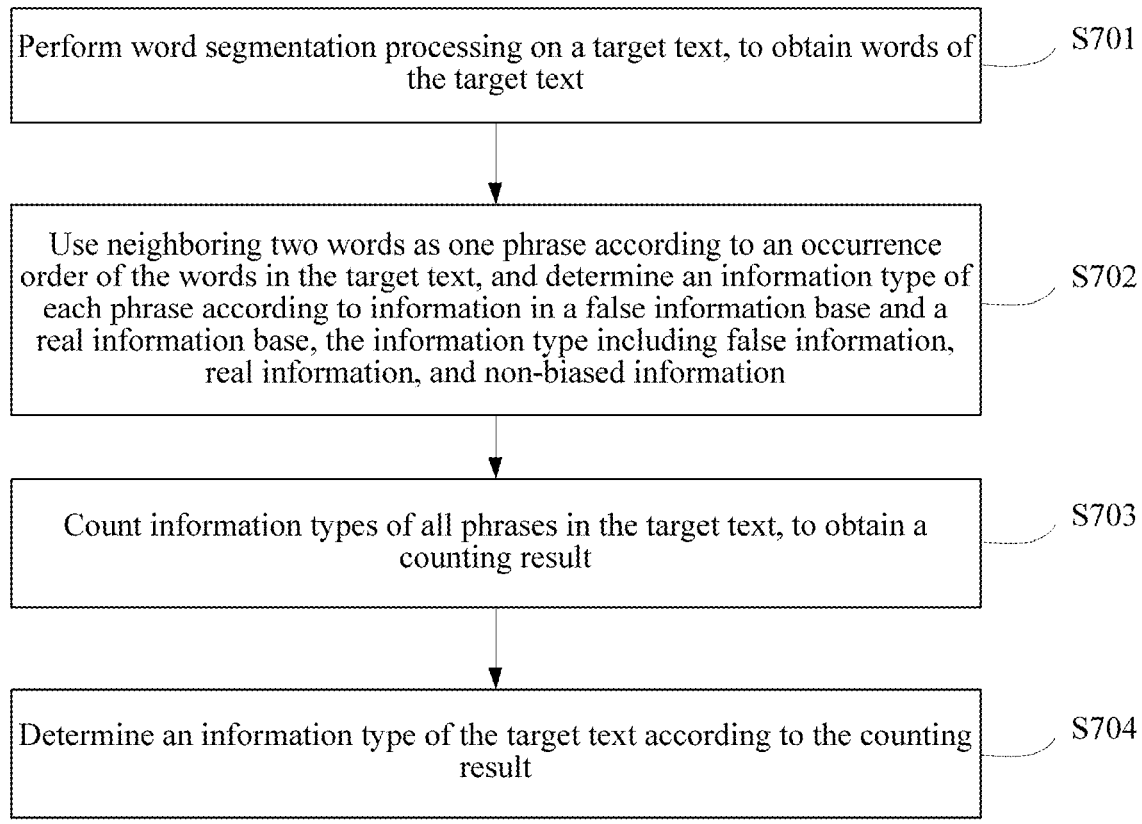
FIG. 7 is a flowchart of a social network information identification method according to an embodiment.

In the foregoing running environment, this application provides a social network information identification method shown in FIG. 7. The method may be applied to a smart terminal device, and performed by a processor in the smart terminal device. The smart terminal device may be a smartphone or a tablet computer. The smart terminal device is installed with at least one application program, and this embodiment does not limit the type of the application program, which may be a system type application program or may be a software type application program.

FIG. 7 is a flowchart of a social network information identification method according to an embodiment of the present disclosure. As shown in FIG. 7, a solution of the method includes the following steps:

Step S701. Perform word segmentation processing on a target text, to obtain words of the target text.

Step 702. Use neighboring two words as one phrase according to an occurrence order of the words in the target text, and determine an information type of each phrase according to information in a false information base and a real information base, the information type including false information, real information, and non-biased information.

Step S703. Count information types of all phrases in the target text, to obtain a counting result.

Step S704. Determine an information type of the target text according to the counting result.

As an implementation of step S702, the determining an information type of each phrase according to information in a false information base and a real information base includes:

Step 1. Obtain an associated value of two words in each phrase through calculation according to the formula $X(W12)=C(W2)*C(W12)/C(W1)$, where $X(W12)$ represents an associated value of two words in the phrase, $C(W1)$ represents a frequency at which a first word in the phrase occurs in the target text, $C(W2)$ represents a frequency at which a second word in the phrase occurs in the target text, $C(W12)$ represents a frequency at which both the first word and the second word successively occur in the target text in an order, and an occurrence order of the first word in the target text is earlier than that of the second word.

Step 2. Extract an associated value of corresponding two words in the false information base as a first associated value; extract an associated value of corresponding two words in the real information base as a second associated value; and determine the information type of the phrase according to the proximity of the associated value to the first associated value and the second associated value separately, which specifically includes: calculating a difference between the associated value and the first associated value to obtain a first difference; and calculating a difference between the associated value and the second associated value to obtain a second difference; comparing an absolute value of the first difference and an absolute value of the second difference, determining that the information type of the phrase is real information if the absolute value of the first difference is greater than the absolute value of the second difference, determining the information type of the phrase is false information if the absolute value of the first difference is less than the absolute value of the second difference, and determining that the information type of the phrase is non-biased information if the absolute value of the first difference is equal to the absolute value of the second difference.

In this embodiment, a false information base and a real information base are established, false information and corresponding real information are analyzed, a relevancy between neighboring keywords in the false information and a relevancy between neighboring keywords in the real information are obtained are obtained through calculation, the proximity between a relevancy of neighboring keywords in a target text and the two relevancies is determined to determine an information type of the neighboring keywords in the target text, and information types of all neighboring keywords in the target text are counted to further obtain an information type of the target text, so as to rapidly identify false information in a network by using a relatively simple algorithm, and provide an important basis to a network manager for rapid response.

Figure 8:
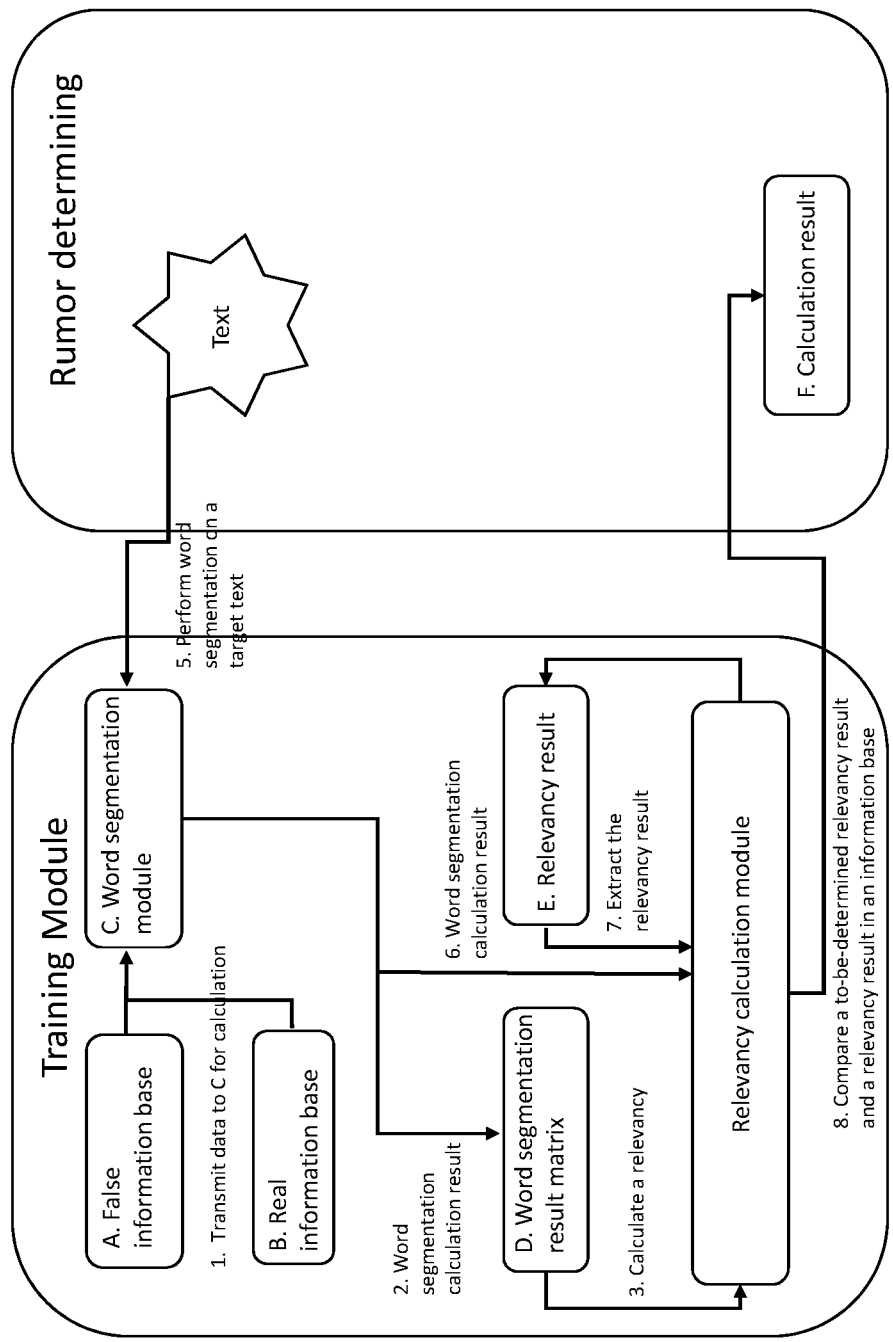
FIG. 8 is a flowchart of a social network information identification method according to an embodiment.

This embodiment provides a social network information identification method. In the running environment of the foregoing embodiments, this embodiment of this application provides a social network information identification method shown in FIG. 8. As shown in FIG. 8, FIG. 8 is a flowchart of the social network information identification method according to this embodiment. A solution of the method includes the following steps:

Step 1. Process a false information sample in the false information base and a real information sample in the real information base.

The false information sample in the false information base may be collected manually, and the real information sample in the real information base may be extracted from a known knowledge base (such as various types of encyclopedic knowledge). Preferably, the false information sample and the real information sample are collected on a one-to-one correspondence. When a wrong false information sample is collected, a correct real information sample is searched for correspondingly, the false information sample is stored in the false information base, and the real information sample is stored in the real information base.

A processing process of the information samples includes: performing word segmentation processing on the false information sample in the false information base, obtaining words of the false information sample, and obtaining an associated value of neighboring two words through calculation according to an occurrence order of the words in the false information sample; and performing word segmentation processing on the real information sample in the real information base, obtaining words of the real information sample, and obtaining an associated value of neighboring two words through calculation according to an occurrence order of the words in the real information sample.

Because a preprocessing process of the false information sample is the same as a preprocessing process of the real information sample, the following describes the preprocessing process by using the false information sample as an example.

Referring to FIG. 8, the preprocessing process of the false information sample includes:

First. Extract a false information sample from the false information base, and input the false information sample to a word segmentation module.

Second. Perform word segmentation processing on the false information sample by using the word segmentation module, to obtain a word segmentation result of the false information sample.

This specifically includes:

First, the false information sample is preprocessed to remove stop words in the false information sample, where the stop words are collected manually and mainly include punctuations, pronouns, modal particles, auxiliary words, conjunctions, and the like, and these stop words generally have no special meanings and often form words or phrases with other words.

Then, word segmentation is performed on the false information sample whose stop words have been removed by using a dictionary word segmentation method. During the word segmentation, a forward maximum matching algorithm, a reverse maximum matching algorithm, or a bi-directional maximum matching algorithm may be used. The forward maximum matching algorithm and the reverse maximum matching algorithm are common word segmentation methods, and their specific steps are not described herein. The bi-directional maximum matching algorithm is specifically: performing word segmentation on a text whose words are to be segmented by using the forward maximum matching algorithm and the reverse maximum matching algorithm separately, when the quantities of words in word segmentation results obtained by using the forward maximum matching algorithm and the reverse maximum matching algorithm are inconsistent, the result with less words is taken as a final result, and if the quantities of the words in the word segmentation results obtained by using the two methods are consistent, one of the word segmentation results is taken as a final result.

Then, occurrence frequencies of all words in the false information sample are counted, forward sorting is performed according to an occurrence order of all words in the false information sample, and the occurrence frequencies of all words in the false information sample are recorded correspondingly. For example, text Q: warm and hot dog meat and mutton cannot be eaten with cold and cool mung beans and a watermelon. After word segmentation processing is performed on text Q, a word segmentation result in a matrix format may be obtained, as shown in Table 1.

Table 1

| Word | Warm | Hot | Dog meat | Mutton | Cannot | Cold | Cool | Mung beans | water-melon | eaten with | Other words |
|---|---|---|---|---|---|---|---|---|---|---|---|
| Frequency | 1 | 1 | 1 | 1 | 1 | 1 | 1 | 1 | 1 | 1 | 0 |

Third, the word segmentation result is input to a relevancy calculation module, and a relevancy between neighboring two words is calculated according to the occurrence order of all words in the false information sample, to obtain an associated value of the neighboring two words.

Specifically, the associated value of neighboring two words may be calculated according to the formula $X(W)=C(W02)*C(W)/C(W01)$ and according to the occurrence order of all words in the false information sample.

$X(W)$ represents the associated value of neighboring two words, $C(W01)$ represents a frequency at which a first word of the two words occurs in the false information sample, $C(W02)$ represents a frequency at which a second word of the two words occurs in the false information sample, an occurrence order of the first word is earlier than that of the second word, and $C(W)$ represents a frequency at which both the first word and the second word successively occur in the false information sample in an order.

Fourth, the neighboring two words and the associated value are stored correspondingly.

Step 2. Perform word segmentation processing on a target text, to obtain words of the target text.

The performing word segmentation processing on a target text, to obtain words of the target text specifically includes:

First. Obtain a target text, where the target text may be obtained from social application software, for example, Weibo information is extracted from Weibo, and the Weibo information is used as the target text, or a public account article or a Wechat friend circle message is extracted from Wechat, and the article or the friend circle message is used as the target text.

Second. Preprocess the target text, to remove stop words in the target text.

The stop words are collected manually and mainly include punctuations, pronouns, modal particles, auxiliary words, conjunctions, and the like, and these stop words generally have no special meanings and often form words or phrases with other words. Terms generally do not include stop words. Examples of stop words are: "oh", "ah", "uh", "and", "of", "to", "almost", "what", "I", "it", "we", and the like.

Third. Perform word segmentation processing on the target text by using a dictionary word segmentation method, to obtain words of the target text.

Word segmentation is performed on the target text whose stop words have been removed by using a dictionary word segmentation method. During the word segmentation, a forward maximum matching algorithm, a reverse maximum matching algorithm, or a bi-directional maximum matching algorithm may be used. The forward maximum matching algorithm and the reverse maximum matching algorithm are common word segmentation methods, and their specific steps are not described herein. The bi-directional maximum matching algorithm is specifically: performing word segmentation on a text whose words are to be segmented by using the forward maximum matching algorithm and the reverse maximum matching algorithm separately, when the quantities of words in word segmentation results obtained by using the forward maximum matching algorithm and the reverse maximum matching algorithm are inconsistent, and the result with less words is taken as a final result, and if the quantities of the words in the word segmentation results obtained by using the two methods are consistent, one of the word segmentation results is taken as a final result. Then, occurrence frequencies of all words in the target text are counted, forward sorting is performed according to an occurrence order of all words in the text, and the occurrence frequencies of all words in the false information sample are recorded correspondingly, to obtain a word segmentation result represented by a matrix.

Step 3. Use neighboring two words as one phrase according to an occurrence order of the words in the target text, and determine an information type of each phrase according to information in a false information base and a real information base, the information type including false information, real information, and non-biased information.

Figure 9:
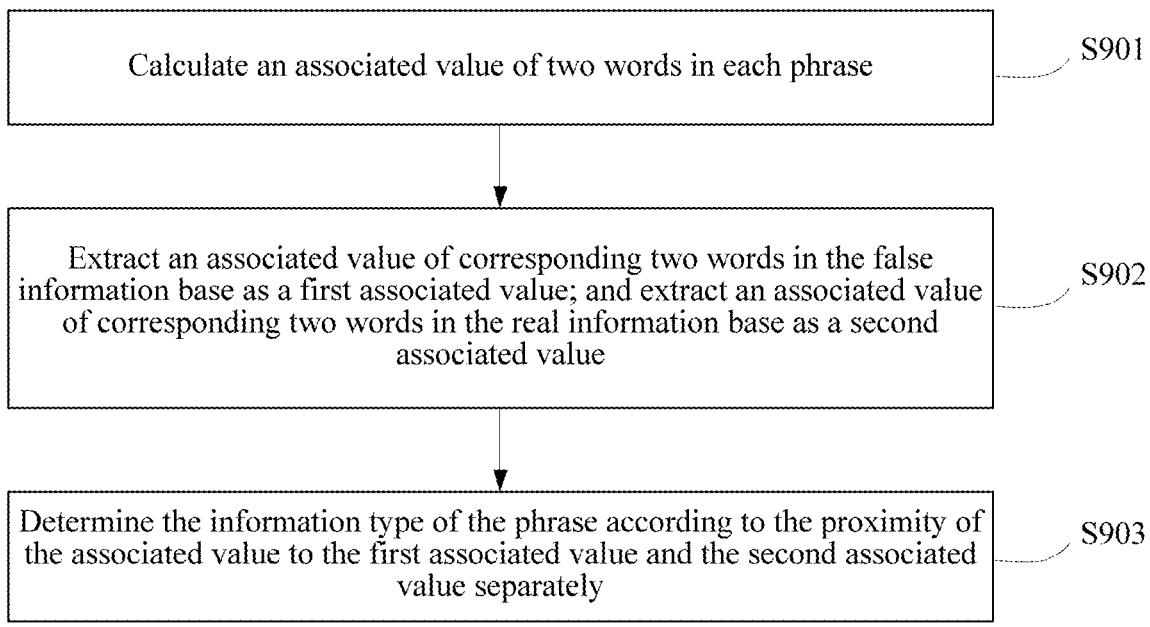
FIG. 9 is a flowchart of a method for determining an information type of a phrase according to an embodiment.

FIG. 9 is a flowchart of a method for determining an information type of a phrase according to an embodiment. Referring to FIG. 9, the method for determining an information type of a phrase includes:

S901. Calculate an associated value of two words in each phrase.

Specifically, an associated value of two words in a phrase may be obtained through calculation according to the formula $X(W12)=C(W2)*C(W12)/C(W1)$, where $X(W12)$ represents the associated value of the two words in the phrase, $C(W1)$ represents a frequency at which a first word in the phrase occurs in the target text, $C(W2)$ represents a frequency at which a second word in the phrase occurs in the target text, $C(W12)$ represents a frequency at which both the first word and the second word successively occur in the target text in an order, and an occurrence order of the first word in the target text is earlier than that of the second word.

S902. Extract an associated value of corresponding two words in the false information base as a first associated value; and extract an associated value of corresponding two words in the real information base as a second associated value.

S903. Determine the information type of the phrase according to the proximity of the associated value to the first associated value and the second associated value separately.

The determining the information type of the phrase according to the proximity of the associated value to the first associated value and the second associated value separately includes:

calculating a difference between the associated value and the first associated value to obtain a first difference; and calculating a difference between the associated value and the second associated value to obtain a second difference; and comparing an absolute value of the first difference and an absolute value of the second difference, determining that the information type of the phrase is real information if the absolute value of the first difference is greater than the absolute value of the second difference, determining the information type of the phrase is false information if the absolute value of the first difference is less than the absolute value of the second difference, and determining that the information type of the phrase is non-biased information if the absolute value of the first difference is equal to the absolute value of the second difference.

For example, if an associated value of neighboring two words "mutton" and "mung beans" in the target text is 4, an associated value of corresponding two words "mutton" and "mung beans" in the false information base is 1, and an associated value of corresponding two words "mutton" and "mung beans" in the real information base is 3, 1 may be used as a first associated value, and 3 may be used as a second associated value; it is obtained through calculation that the absolute value of the first difference is 3 and the absolute value of the second difference is 1, and it may be determined that the information type of the phrases ("mutton" and "mung beans") is real information.

Step 4. Count information types of all phrases in the target text, to obtain a counting result.

The step includes: obtaining information types of all phrases in the target text; and counting occurrence frequencies of all information types, to obtain a counting result.

Step 5. Determine an information type of the target text according to the counting result.

The determining an information type of the target text according to the counting result includes:

comparing an occurrence frequency of the false information and an occurrence frequency of the real information, determining an information type with a larger occurrence frequency as the information type of the target text, and determining that the information type of the target text is non-biased information if the occurrence frequency of the false information is the same as the occurrence frequency of the real information.

It should be noted that, for ease of description, the foregoing method embodiments are described as a series of action combinations. However, a person skilled in the art should understand that the embodiments are not limited to the described sequence of the actions, because some steps may be performed in another sequence or performed at the same time according to the embodiments. In addition, a person skilled in the art should also know that actions and modules involved in the embodiments described in this specification are not necessarily required in the embodiments.

Based on the foregoing descriptions of the embodiments, a person skilled in the art may clearly understand that the method according to the foregoing embodiment may be implemented by software in addition to necessary universal hardware or certainly by hardware, but in most cases, the former one is the better implementation. Based on such an understanding, the technical solutions of the embodiments essentially or the part contributing to the related art technology may be implemented in a form of a software product. The computer software product is stored in a storage medium (such as a ROM/RAM, a magnetic disk, or an optical disc), and includes several instructions for instructing a terminal device (which may be a mobile phone, a personal computer, a server, a network device, or the like) to perform the methods described in the embodiments.

Figure 10:
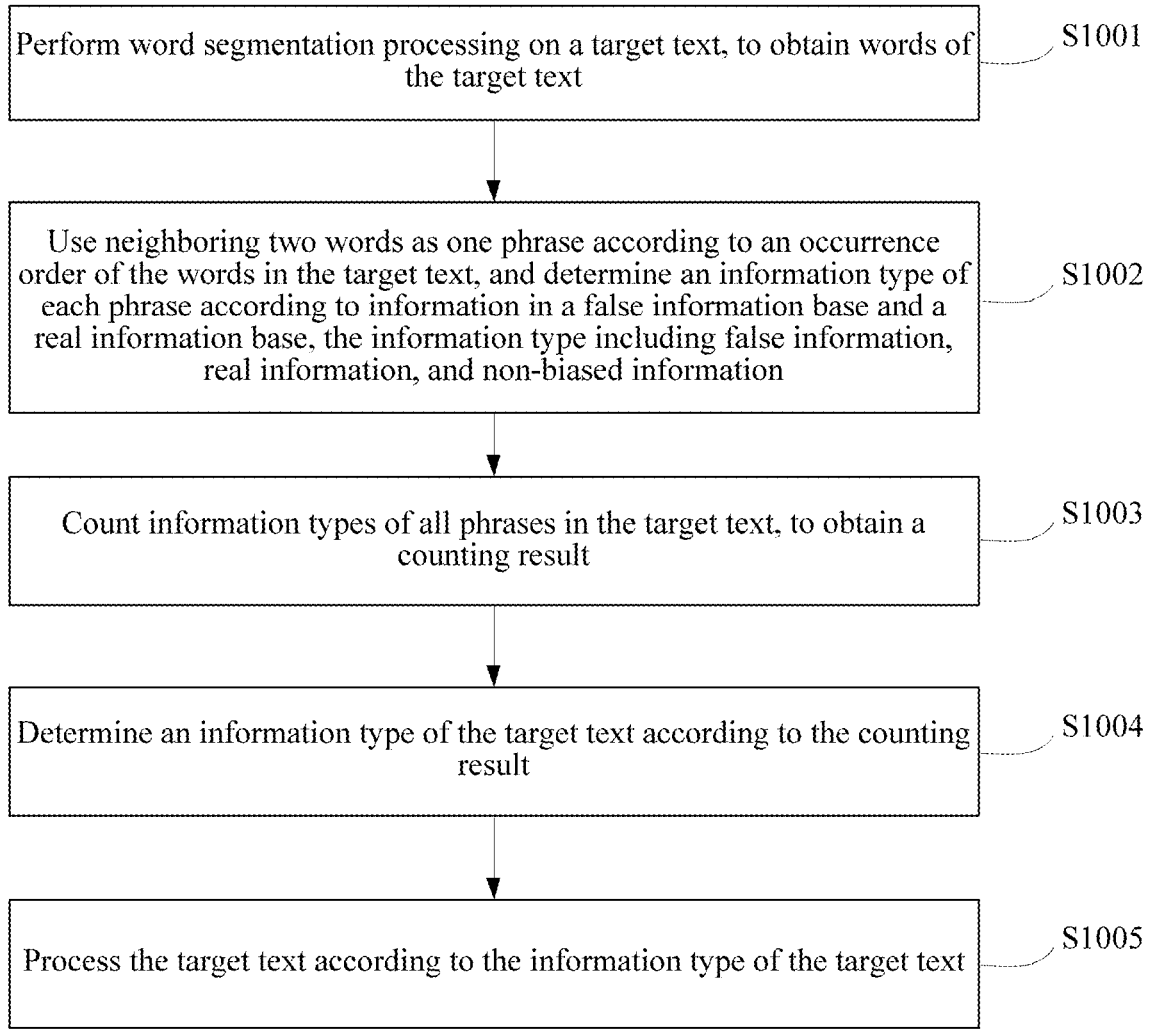
FIG. 10 is a flowchart of a social network information processing method according to an embodiment.

This embodiment provides a social network information processing method. In the running environment of the embodiments, this application provides a social network information processing method shown in FIG. 10. As shown in FIG. 10, FIG. 10 is a flowchart of the social network information processing method according to this embodiment. A solution of the method includes the following steps:

S1001. Perform word segmentation processing on a target text, to obtain words of the target text.

S1002. Use neighboring two words as one phrase according to an occurrence order of the words in the target text, and determine an information type of each phrase according to information in a false information base and a real information base, the information type including false information, real information, and non-biased information.

S1003. Count information types of all phrases in the target text, to obtain a counting result.

S1004. Determine an information type of the target text according to the counting result.

S1005. Process the target text according to the information type of the target text.

The processing the target text according to the information type of the target text includes: deleting the target text in a social network if the information type of the target text is false information.

The target text may be obtained from social application software, for example, Weibo information is extracted from Weibo, and the Weibo information is used as the target text, or a public account article or a Wechat friend circle message is extracted from Wechat, and the article or the friend circle message is used as the target text. When it is determined that the information type of the target text is false information, the corresponding target text in the social network is deleted. For example, if the target text is a Wechat friend circle message, when it is determined that the target text is false information, a network manager may be instructed to manually process the information, or automatically delete the friend circle message.

In this embodiment, a relatively simple algorithm is used to rapidly identify false information in a network, and an important basis may be provided to a network manager for rapid response, so that the network manager processes the false information in the network in time, to reduce or avoid bad impact of spreading of the false information.

Figure 11:
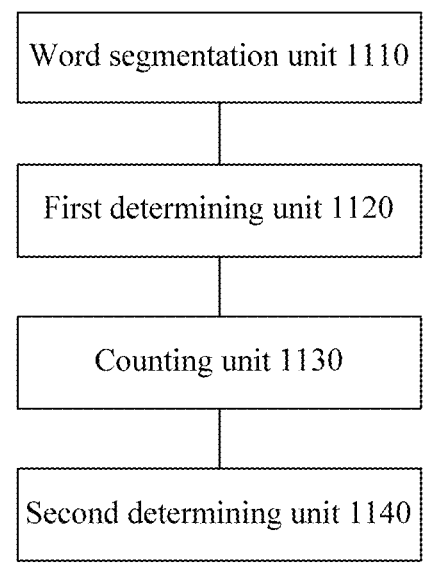
FIG. 11 is a schematic diagram of a social network information identification apparatus according to an embodiment.

This embodiment provides a social network information identification apparatus. As shown in FIG. 11, the apparatus includes a word segmentation unit 1110, a first determining unit 1120, a counting unit 1130, and a second determining unit 1140.

The word segmentation unit 1110 is configured to perform word segmentation processing on a target text, to obtain words of the target text.

The first determining unit 1120 is configured to use neighboring two words as one phrase according to an occurrence order of the words in the target text, and determine an information type of each phrase according to information in a false information base and a real information base, the information type including false information, real information, and non-biased information.

The counting unit 1130 is configured to count information types of all phrases in the target text, to obtain a counting result.

The second determining unit 1140 is configured to determine an information type of the target text according to the counting result.

In the social network information identification apparatus of this embodiment, the word segmentation unit 1110 is configured to perform step S701 in the embodiments, the first determining unit 1120 is configured to perform step S702 in the embodiments, the counting unit 1130 is configured to perform step S703 in the embodiments, and the second determining unit 1140 is configured to perform step S704 in the embodiments.

Figure 12:
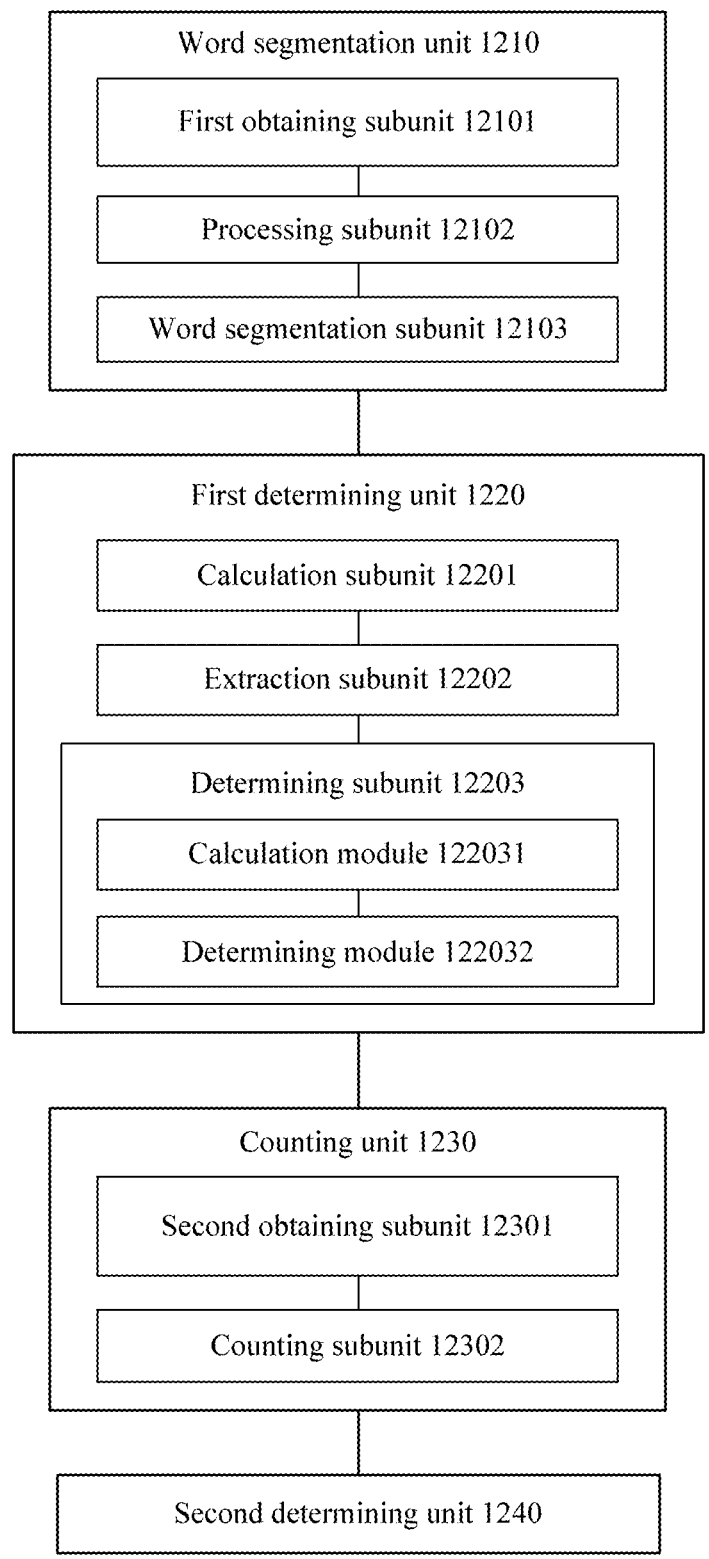
FIG. 12 is a schematic diagram of a social network information identification apparatus according to an embodiment.

Referring to FIG. 12 as an implementation, the word segmentation unit 1210 includes a first obtaining subunit 12101, a processing subunit 12102, and a word segmentation subunit 12103.

The first obtaining subunit 12101 is configured to obtain a target text.

The processing subunit 12102 is configured to preprocess the target text, to remove stop words in the target text.

The word segmentation subunit 12103 is configured to perform word segmentation processing on the target text processed by the processing subunit by using a dictionary word segmentation method, to obtain the words of the target text.

As an implementation, the first determining unit 1220 includes a calculation subunit 12201, an extraction subunit 12202, and a determining subunit 12203.

The calculation subunit 12201 is configured to calculate an associated value of two words in each phrase.

The extraction subunit 12202 is configured to extract an associated value of corresponding two words in the false information base as a first associated value; and extract an associated value of corresponding two words in the real information base as a second associated value.

The determining subunit 12203 is configured to determine the information type of the phrase according to the proximity of the associated value to the first associated value and the second associated value separately.

Further, the determining subunit 1203 includes a calculation module 122031 and a determining module 122032.

The calculation module 122031 is configured to calculate a difference between the associated value and the first associated value to obtain a first difference; and calculate a difference between the associated value and the second associated value to obtain a second difference.

The determining module 122032 is configured to compare an absolute value of the first difference and an absolute value of the second difference, determine that the information type of the phrase is real information if the absolute value of the first difference is greater than the absolute value of the second difference, determine the information type of the phrase is false information if the absolute value of the first difference is less than the absolute value of the second difference, and determine that the information type of the phrase is non-biased information if the absolute value of the first difference is equal to the absolute value of the second difference.

The calculation subunit 12201 is specifically configured to obtain an associated value of two words in a phrase through calculation according to the formula $X(W12)=C(W2)*C(W12)/C(W1)$, where $X(W12)$ represents an associated value of two words in the phrase, $C(W1)$ represents a frequency at which a first word in the phrase occurs in the target text, $C(W2)$ represents a frequency at which a second word in the phrase occurs in the target text, $C(W12)$ represents a frequency at which both the first word and the second word successively occur in the target text in an order, and an occurrence order of the first word in the target text is earlier than that of the second word.

As an implementation, the counting unit 1230 includes:

a second obtaining subunit 12301, configured to obtain the information types of all phrases in the target text; and a counting subunit 12302, configured to count occurrence frequencies of all information types, to obtain a counting result.

The second determining unit 1240 is specifically configured to compare an occurrence frequency of the false information and an occurrence frequency of the real information, determine an information type with a larger occurrence frequency as the information type of the target text, and determine that the information type of the target text is non-biased information if the occurrence frequency of the false information is the same as the occurrence frequency of the real information.

Further, the apparatus further includes a preprocessing unit and a storage unit.

The preprocessing unit is configured to perform word segmentation processing on a false information sample in the false information base, obtain words of the false information sample, and obtain an associated value of neighboring two words through calculation according to an occurrence order of the words in the false information sample; and is further configured to perform word segmentation processing on a real information sample in the real information base, obtain words of the real information sample, and obtain an associated value of neighboring two words through calculation according to an occurrence order of the words in the real information sample.

The storage unit includes a first storage module and a second storage module. The first storage module is configured to store associated values and corresponding words obtained by preprocessing the false information sample, and the second storage module is configured to store associated values and corresponding words obtained by preprocessing the real information sample.

In this embodiment, word segmentation is performed on a target text, neighboring two words are used as one phrase, an associated value of two words in each phrase is calculated, and is compared with an associated value of corresponding two words in a false information base and an associated value of corresponding two words in a real information base, an information type of each phrase in the target text is determined according to the proximity between the associated values, and information types of all phrases in the target text are further counted to determine an information type of the target text. Therefore, a relatively simple algorithm is used to rapidly identify false information in a network, and an important basis may be provided to a network manager for rapid response, so that the network manager processes the false information in the network in time, to reduce or avoid bad impact of spreading of the false information.

Figure 13:
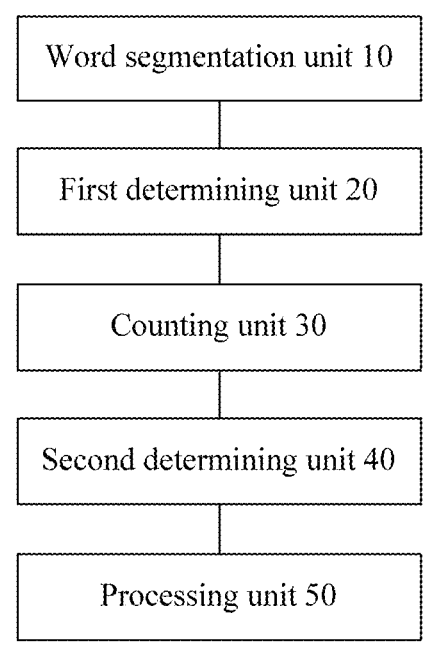
FIG. 13 is a schematic diagram of a social network information processing apparatus according to an embodiment.

This embodiment provides a social network information processing apparatus. As shown in FIG. 13, the apparatus includes a word segmentation unit 1310, a first determining unit 1320, a counting unit 1330, a second determining unit 1340, and a processing unit 1350.

The word segmentation unit 1310 is configured to perform word segmentation processing on a target text, to obtain words of the target text.

The first determining unit 1320 is configured to use neighboring two words as one phrase according to an occurrence order of the words in the target text, and determine an information type of each phrase according to information in a false information base and a real information base, the information type including false information, real information, and non-biased information.

The counting unit 1330 is configured to count information types of all phrases in the target text, to obtain a counting result.

The second determining unit 1340 is configured to determine an information type of the target text according to the counting result.

The processing unit 1350 is configured to process the target text according to the information type of the target text.

In the social network information identification apparatus of this embodiment, the word segmentation unit 1310 is configured to perform step S1001 in the embodiments, the first determining unit 1320 is configured to perform step S1002 in the embodiments, the counting unit 1330 is configured to perform step S1003 in the embodiments, the second determining unit 1340 is configured to perform step S1004 in the embodiments, and the processing unit 1350 is configured to perform step S1005 in the embodiments.

The processing unit 1350 is specifically configured to delete the target text in a social network when the second determining unit determines that the information type of the target text is false information.

This embodiment further provides a storage medium. In this embodiment, the foregoing storage medium may be used to store program code executed by a social network information identification method in the foregoing embodiment.

In this embodiment, the foregoing storage medium may be located in at least one of multiple network devices in a computer network.

In this embodiment, the storage medium is set to store program code used to perform the following steps:

First step. Perform word segmentation processing on a target text, to obtain words of the target text.

Second step. Use neighboring two words as one phrase according to an occurrence order of the words in the target text, and determine an information type of each phrase according to information in a false information base and a real information base, the information type including false information, real information, and non-biased information.

Third step. Count information types of all phrases in the target text, to obtain a counting result.

Fourth step. Determine an information type of the target text according to the counting result.

The storage medium is further set to store program code used to perform the following steps: obtaining a target text; preprocessing the target text, to remove stop words in the target text; and performing word segmentation processing on the target text by using a dictionary word segmentation method, to obtain the words of the target text.

The storage medium is further set to store program code used to perform the following steps: calculating an associated value of two words in each phrase; extracting an associated value of corresponding two words in the false information base as a first associated value; and extracting an associated value of corresponding two words in the real information base as a second associated value; and determining the information type of the phrase according to the proximity of the associated value to the first associated value and the second associated value separately.

The storage medium is further set to store program code used to perform the following steps: calculating a difference between the associated value and the first associated value to obtain a first difference; and calculating a difference between the associated value and the second associated value to obtain a second difference; and comparing an absolute value of the first difference and an absolute value of the second difference, determining that the information type of the phrase is real information if the absolute value of the first difference is greater than the absolute value of the second difference, determining the information type of the phrase is false information if the absolute value of the first difference is less than the absolute value of the second difference, and determining that the information type of the phrase is non-biased information if the absolute value of the first difference is equal to the absolute value of the second difference.

The storage medium is further set to store program code used to perform the following steps: obtaining information types of all phrases in the target text; and counting occurrence frequencies of all information types, to obtain a counting result.

The storage medium is further set to store program code used to perform the following steps: comparing an occurrence frequency of the false information and an occurrence frequency of the real information, determining an information type with a larger occurrence frequency as the information type of the target text, and determining that the information type of the target text is non-biased information if the occurrence frequency of the false information is the same as the occurrence frequency of the real information.

The storage medium is further set to store program code used to perform the following steps: performing word segmentation processing on a false information sample in the false information base, obtaining words of the false information sample, and obtaining an associated value of neighboring two words through calculation according to an occurrence order of the words in the false information sample; and performing word segmentation processing on a real information sample in the real information base, obtaining words of the real information sample, and obtaining an associated value of neighboring two words through calculation according to an occurrence order of the words in the real information sample.

In this embodiment, the foregoing storage medium may include but not limited to various media that may store program code, such as a USB flash disk, a ROM, a RAM, a removable hard disk, a magnetic disk, or an optical disc.

This embodiment further provides a storage medium. In this embodiment, the foregoing storage medium may be used to store program code executed by a social network information processing method in the foregoing embodiment.

In this embodiment, the foregoing storage medium may be located in at least one of multiple network devices in a computer network.

In this embodiment, the storage medium is set to store program code used to perform the following steps:

First step. Perform word segmentation processing on a target text, to obtain words of the target text.

Second step. Use neighboring two words as one phrase according to an occurrence order of the words in the target text, and determine an information type of each phrase according to information in a false information base and a real information base, the information type including false information, real information, and non-biased information.

Third step. Count information types of all phrases in the target text, to obtain a counting result.

Fourth step. Determine an information type of the target text according to the counting result.

Fifth step. Process the target text according to the information type of the target text.

The storage medium is further set to store program code used to perform the following steps: deleting the target text in a social network when the information type of the target text is false information.

This embodiment further provides a computer terminal, and the computer terminal may be any computer terminal device in a computer terminal group. In this embodiment, the foregoing computer terminal may be replaced with a terminal device such as a mobile terminal.

In this embodiment, the foregoing computer terminal may be located in at least one of multiple network devices in a computer network.

Figure 14:
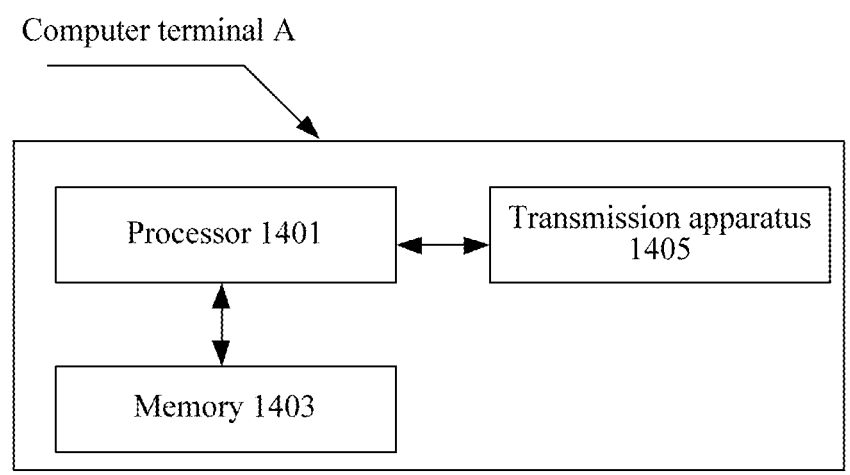
FIG. 14 is a structural block diagram of a computer terminal according to an embodiment.

FIG. 14 is a structural block diagram of a computer terminal according to an embodiment. As shown in FIG. 14, the computer terminal A may include: one or more (only one is shown in the figure) processors 1401, a memory 1403, and a transmission apparatus 1405.

The memory 1403 may be configured to store a software program and a module, for example, a program instruction/module corresponding to the social network information identification method and apparatus in the embodiments. The processor 1401 performs various functional applications and data processing by running the software program and the module stored in the memory 1403, that is, implementing the foregoing social network information identification method. The memory 1403 may include a high-speed random memory, and may also include a nonvolatile memory such as one or more magnetic storage devices, a flash memory, or another nonvolatile solid-state memory. In some instances, the memory 1403 may further include memories remotely disposed relative to the processor 1401, and these remote memories may be connected to the computer terminal A through a network. Instances of the network include, but are not limited to, the Internet, an intranet, a local area network, a mobile communications network, and a combination thereof.

The foregoing transmission apparatus 1405 is configured to receive or send data through a network. Specific instances of the foregoing network may include a wired network and a wireless network. In an instance, the transmission apparatus 1405 includes a network interface controller that may be connected to another network device and a router by using a network cable, thereby communicating with the Internet or a local area network. In an instance, the transmission apparatus 1405 is an RF module that is configured to communicate with the Internet in a wireless manner.

Specifically, the memory 1403 is configured to store information about a preset action condition and a preset privileged user, and an application program.

The processor 1401 may invoke, by using the transmission apparatus, the information and the application program stored in the memory 1403, so as to perform the following steps:

First step. Perform word segmentation processing on a target text, to obtain words of the target text.

Second step. Use neighboring two words as one phrase according to an occurrence order of the words in the target text, and determine an information type of each phrase according to information in a false information base and a real information base, the information type including false information, real information, and non-biased information.

Third step. Count information types of all phrases in the target text, to obtain a counting result.

Fourth step. Determine an information type of the target text according to the counting result.

This embodiment provides a multimedia file identification method based on a behavior feature. It should be noted that, steps shown in the flowcharts of the accompanying drawings may be performed in a computer system of a group of computer executable instructions, and although the flowcharts show the logical sequence, in some cases, the shown or described step different from the sequence herein may be performed.

Figure 15:
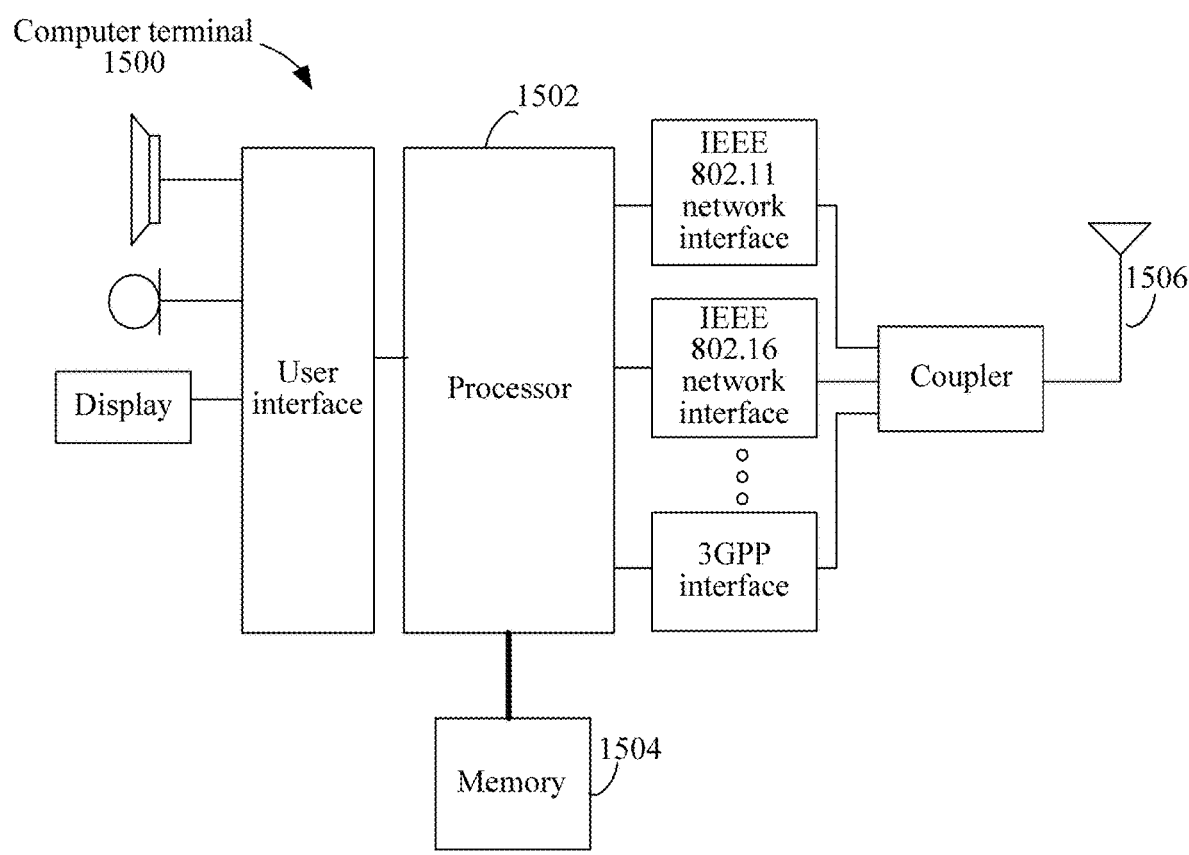
FIG. 15 is a block diagram of a hardware structure of a computer terminal for implementing a multimedia file identification method based on a behavior feature according to an embodiment.

The method embodiment provided in this application may be performed in a mobile terminal, a computer terminal, or a similar operational apparatus. That the method is running in a computer terminal is used as an example. FIG. 15 is a block diagram of a hardware structure of a computer terminal that may be used to implement the multimedia file identification method based on a behavior feature according to this embodiment. As shown in FIG. 15, the computer terminal 1500 may include one or more (only one is shown in the figure) processors 1502 (the processor 1502 may include but not limited to a processing apparatus such as a microprocessor MCU or a programmable logic device FPGA), a memory 1504 used to store data, and a transmission apparatus 1506 used for a communication function. It may be understood by a person of ordinary skill in the art that the structure shown in FIG. 15 is merely illustrative instead of limiting a structure of the foregoing electronic apparatus. For example, the computer terminal 1500 may also include more or fewer components than those shown in FIG. 15, or have a configuration different from that shown in FIG. 15.

The memory 1504 may be configured to store a software program of application software and a module, for example, a program instruction/module corresponding to the multimedia file identification method based on a behavior feature in this embodiment, and the processor 1502 performs various functional applications and data processing by running a software program and a module stored in the memory 1504, that is, implementing the foregoing multimedia file identification method based on a behavior feature. The memory 1504 may include a high-speed random memory, and may also include a nonvolatile memory such as one or more magnetic storage devices, a flash memory, or another nonvolatile solid-state memory. In some instances, the memory 1504 may further include memories remotely disposed relative to the processor 1502, and these remote memories may be connected to the computer terminal 1500 through a network. Instances of the network include, but are not limited to, the Internet, an intranet, a local area network, a mobile communications network, and a combination thereof.

The transmission apparatus 1506 is configured to receive or send data through a network. Specific instances of the network may include a wireless network provided by a communications provider of the computer terminal 1500. In an instance, the transmission apparatus 1506 includes a network interface controller (NIC) that may be connected to another network device by using a base station, thereby communicating with the Internet. In an instance, the transmission apparatus 1506 may be an RF module that is configured to communicate with the Internet in a wireless manner.

Figure 16:
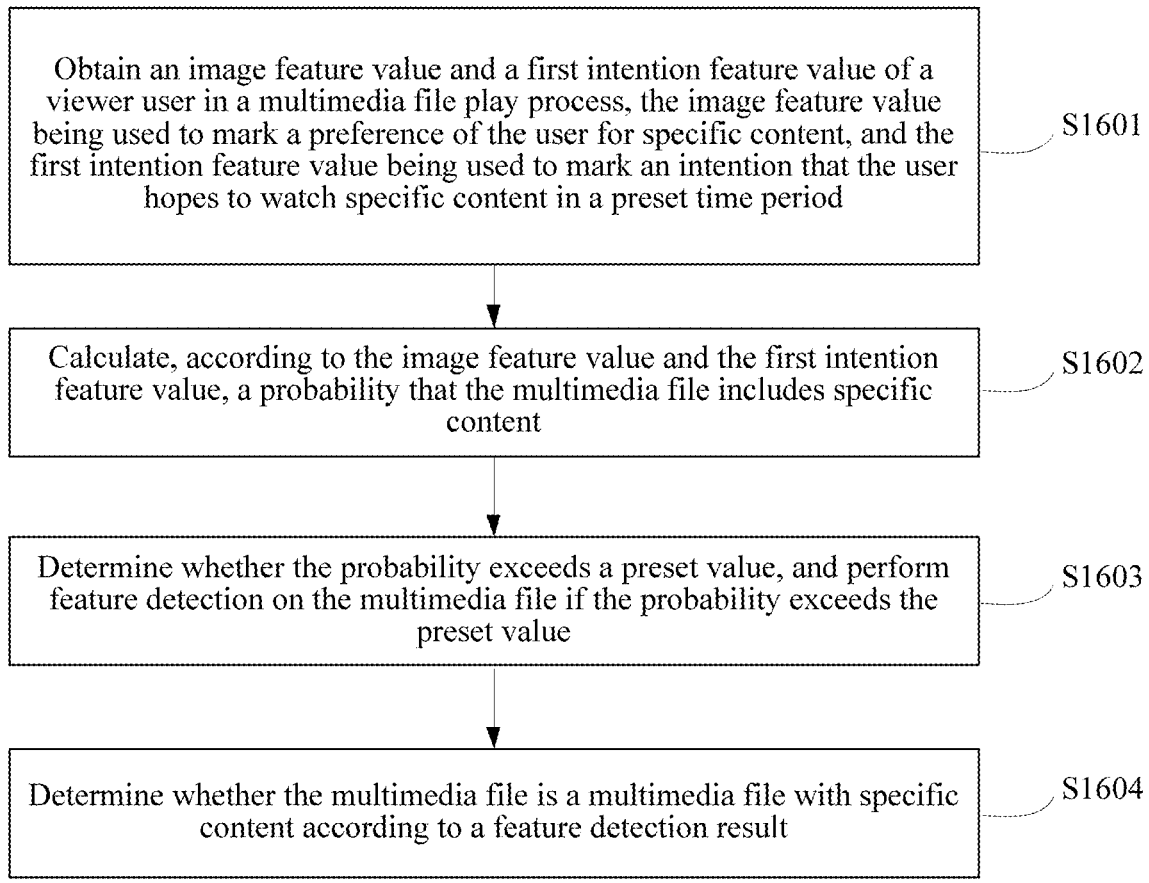
FIG. 16 is a flowchart of a multimedia file identification method based on a behavior feature according to an embodiment.

In the foregoing running environment, this embodiment of this application provides a multimedia file identification method based on a behavior feature shown in FIG. 16. The method may be applied to a smart terminal device, and performed by a processor in the smart terminal device. The smart terminal device may be a smartphone or a tablet computer. The smart terminal device is installed with at least one application program, and this embodiment does not limit the type of the application program, which may be a system type application program or may be a software type application program.

FIG. 16 is a flowchart of a multimedia file identification method based on a behavior feature according to an embodiment. As shown in FIG. 16, a solution of the method includes the following steps:

Step S1601. Obtain an image feature value and a first intention feature value of a viewer user in a multimedia file play process, the image feature value being used to mark a preference of the user for specific content, and the first intention feature value being used to mark an intention that the user hopes to watch specific content in a preset time period.

Step S1602. Calculate, according to the image feature value and the first intention feature value, a probability that the multimedia file includes specific content.

Step S1603. Determine whether the probability exceeds a preset value, and perform feature detection on the multimedia file if the probability exceeds the preset value.

Step S1604. Determine whether the multimedia file is a multimedia file with specific content according to a feature detection result.

As an implementation of step S1602, the calculating, according to the image feature value and the first intention feature value, a probability that the multimedia file includes specific content includes:

determining a second intention feature value of each user according to the image feature value and the first intention feature value; and calculating, according to second intention feature values of all users, the probability that the multimedia file includes specific content.

In this embodiment, an association between an Internet access behavior of a user and specific content watched by the user is analyzed to provide a method: In a multimedia file play process, an image feature value of a viewer user and a first intention feature value used to represent specific content that the user hopes to watch in a preset time are obtained, a probability that the multimedia file includes specific content is calculated according to the image feature value of each user and the first intention feature value, and the probability is compared with a preset value to determine whether the multimedia file needs to be further detected, so as to obtain a to-be-analyzed multimedia file by performing screening by using a behavior feature of the user, and perform specific content detection on the multimedia file obtained through screening, thereby improving the identification efficiency and accuracy for the multimedia file with specific content. Applying this embodiment to detection of bad content of multimedia files such as porn and horrible content can greatly improve the detection efficiency and reliability and facilitate management and control of the multimedia files.

Figure 17:
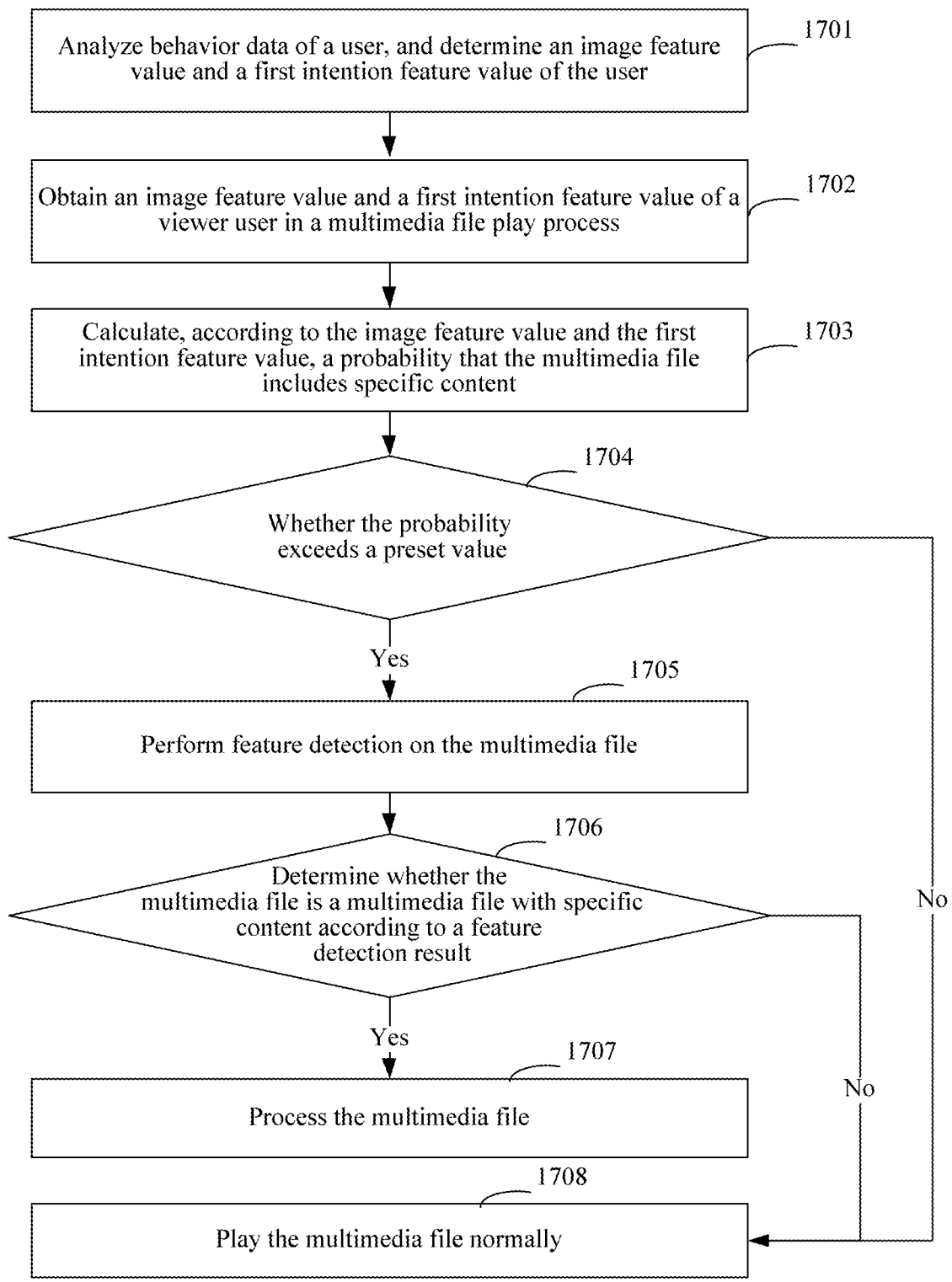
FIG. 17 is a flowchart of a multimedia file identification method based on a behavior feature according to an embodiment.

This embodiment provides a video content identification method based on a behavior feature. In the running environment of the embodiments, this embodiment of this application provides a multimedia file identification method based on a behavior feature shown in FIG. 17. As shown in FIG. 17, FIG. 17 is a flowchart of the multimedia file identification method based on a behavior feature according to this embodiment. A solution of the method includes the following steps:

Step 1701. Analyze behavior data of a user, and determine an image feature value and a first intention feature value of the user.

The Internet access behavior of the user may reflect the preference of the user, and analyzing behaviors of the user browsing, clicking, and recommending information may determine a user image. For example, if the user image is a preference of a porn video, correspondingly, the user image may also help determine a current or future Internet access behavior of the user. For example, a probability that a user who prefers a porn video watches a porn video currently or in the future is larger than a user who prefers a porn video less. The user image usually may reflect multiple preferences of the user, and therefore, determining a current or future behavior of a user only according to the user image is not accurate enough. Because Internet access behaviors of a user are usually successive, searching or browsing for specific content usually continues for a time period. For example, if a user followed porn content several minutes ago, the user is very likely to browse porn related content within a current or future time period. Based on this, the current or future behavior of the user may be determined with reference to the behavior feature of the user in a time period before the current time.

During analyzing of the behavior data of the user, the image feature value may be used to mark a preference of the user for specific content, and the first intention feature value may be used to mark an intention of the user for following specific content in a time period before the current time.

The analyzing behavior data of a user, and determining an image feature value of the user includes: obtaining the behavior data of the user, the behavior data including first behavior data for browsing a text related to specific content, second behavior data for browsing a picture related to specific content, third behavior data for accessing a forum related to specific content, and fourth behavior data for chatting in a chat group related to specific content; separately determining whether the first behavior data, the second behavior data, the third behavior data, and the fourth behavior data are empty, if they are empty, recording them as 0, and if they are not empty, recording them as 1, and obtaining a first determining result R1, a second determining result R2, a third determining result R3, and a fourth determining result R4 correspondingly.

Allocation and integration are performed on the first determining result, the second determining result, the third determining result, and the fourth determining result according to a preset first weight W1 of the first determining result, a preset second weight W2 of the second determining result, a preset third weight W3 of the third determining result, and a fourth weight W4 of the fourth determining result, to obtain a behavior feature value of the user. As a manner, the behavior feature value B=W1*R1+W2*R2+W3*R3+W4*R4, and as another manner, the behavior feature value B=(W1*R1+W2*R2+W3*R3+W4*R4)/4.

The analyzing behavior data of a user, and determining a first intention feature value of the user may be implemented in two manners: (1) Performing determining by obtaining screen display content of the user by using similar software such as PC Manager running on a user terminal; and (2) Capturing traffic of the user on the network, for example, capturing packages on the router, to analyze an operation that is being executed by the user. Specific steps include: obtaining the behavior data of the user in a recent time period, the behavior data including a first time for browsing a text related to specific content, a second time for browsing a picture related to specific content, a third time for accessing a forum related to specific content, and a fourth time for chatting a chat group related to specific content; and assigning the first weight W1 to the first time, assigning the second weight W2 to the second time, assigning the third weight W3 to the third time, assigning the fourth weight W4 to the fourth time, and performing weighted averaging on the first time, the second time, the third time, and the fourth time, to obtain the first intention feature value of the user.

For example, assuming that the specific content is porn content, the image feature value represents a preference degree of the user for porn content, and the first intention feature value represents an intention that the user hopes to watch a porn video within a time period before the current time, the analyzing an Internet access behavior of the user mainly includes whether the user browses texts and pictures related to porn in a recent time period, whether the user accesses forums related to porn, and whether the user speaks in porn chat groups. Browsing porn novels, jokes or Weibo posts related to porn, and the like may be regarded as browsing texts related to porn, and browsing pictures marked as porn, pictures on porn websites, and various beauty pictures on normal websites may be regarded as browsing pictures related to porn. Then, the image feature value of the user is calculated according to weights of the behavior features. For example, if a weight of browsing words related to porn is 0.4, a weight of browsing pictures related to porn is 0.3, a weight of accessing porn forums is 0.6, and a weight of speaking in porn chat groups is 0.5, and if the user browses pictures related to porn, accesses forums related to porn, and further speaks in porn chat groups in a recent time period, the behavior feature value of the user B=0.4*0+0.6*1+0.3*1+0.5*1=1.4. According to historical data analysis, being greater than 1 indicates that the user is more interested in porn content, and the user may be marked as a porn user. If the user spends 10 minutes in watching porn novels, 10 minutes in watching porn pictures, and 20 minutes in accessing porn forums within 40 minutes before the current time, the first intention feature value is (0.4*10+0.3*10+0.6*20)/40=0.475.

Step 1702. Obtain an image feature value and a first intention feature value of a viewer user in a multimedia file play process.

The multimedia file includes texts, pictures, videos, and audio files. This solution may be used to identify whether these files include specific content. The specific content may be horrible and/or porn content. For example, the solution of this embodiment is used to identify whether the texts are porn texts, whether the pictures are porn pictures, and whether the videos are porn videos.

When the multimedia file is a video file, the video may be an on-demand video or a live video, and the live video includes a video played in a live room. In a video play process, the image feature value and the first intention feature value of the viewer user are obtained. The image feature value is used to mark a preference degree of the user for specific content, the first intention feature value is used to mark an intention that the user hopes to watch specific content in a preset time period, and the preset time period generally refers to a time period before the current time, such as 40 minutes before the current time.

Step 1703. Calculate, according to the image feature value and the first intention feature value, a probability that the multimedia file includes specific content.

The calculating, according to the image feature value and the first intention feature value, a probability that the multimedia file includes specific content includes: determining a second intention feature value of each user according to the image feature value and the first intention feature value; and calculating, according to second intention feature values of all users, the probability that the multimedia file includes specific content. Using the image feature value and the first intention feature value comprehensively can improve the accuracy for determining whether the multimedia file includes specific content.

In an embodiment, the image feature value and the first intention feature value may be added, to obtain the second intention feature value. The second intention feature values of the users and a preset threshold are compared separately; and a ratio of the quantity of users with the second intention feature value exceeding the threshold to the total quantity of the users is calculated, to obtain the probability that the multimedia file includes specific content.

In another embodiment, weighted averaging may be further performed on the image feature value and the first intention feature value according to weights preset for the image feature value and the first intention feature value, to obtain the second intention feature value. The second intention feature values of the users and a preset threshold are compared separately; and a ratio of the quantity of users with the second intention feature value exceeding the threshold to the total quantity of the users is calculated, to obtain the probability that the multimedia file includes specific content.

Step 1704. Determine whether the probability exceeds a preset value, if the probability exceeds the preset value, perform step 1705 of performing feature detection on the multimedia file; otherwise, perform step 1708, of playing the multimedia file normally.

The preset value may be set artificially, and the preset value may be adjusted by combining a determining result of whether the multimedia file is a multimedia file with specific content, to improve the accuracy of a final determining result. If the probability does not exceed the preset value, it indicates that the possibility that the multimedia file being played includes specific content is small. To improve the detection efficiency and accuracy, further detection for this type of multimedia file may be abandoned, and no processing is performed. If the probability exceeds the preset value, it indicates that the possibility that the video includes specific content is large, and further detection needs to be performed on the multimedia file content.

For a text file, the further detection includes performing character detection on text content. A character feature base may be established in advance and used to store feature characters extracted from a specific content file (such as a porn novel or a porn picture), then the feature characters in the character feature base are used to match with the text content, and after a matching result exceeds a preset matching threshold, it indicates that the text file includes more feature characters, and it may be determined that the text file is a text with specific content.

For a picture file, the further detection includes performing character detection, sensitive position detection, skin color pixel detection, blood color pixel detection, and the like on the picture. The character detection is performing feature character matching by using a character feature base to perform detection, the sensitive position detection is performing sensitive position matching by using a sensitive position feature base to perform detection, and the blood color pixel detection and the skin color pixel detection may be first establishing a blood color model and a skin color model, and then performing blood color pixel detection and skin color pixel detection on the picture according to the blood color model and the skin color model. Construction methods of the blood color model and the skin color model are an related art technology, and details are not described herein.

For an audio file, during the further detection, an audio detection model may be trained, and a to-be-detected audio file is input to the audio detection model, to obtain a detection result of whether the audio file includes specific content. A construction method of the audio detection model is an related art technology, and details are not described herein.

For a video file, the further detection includes audio detection and image detection. The audio detection may be performing detection by using an audio detection model; and the image detection includes extracting an image of the video and performing feature detection on the image. Specifically, the extracting an image of the video and performing feature detection on the image includes: extracting a preset quantity of images from the video at equal time intervals, for example, performing screen capture on the video at an internal of 10 s to extract images; and then performing feature detection on each image, and determining whether the image includes a specific feature. The feature detection includes motion detection, character detection, sensitive position detection, skin color pixel detection, blood color pixel detection, and the like.

Step 1706: Determine whether the multimedia file is a multimedia file with specific content according to a feature detection result.

The multimedia file is a video file. In an embodiment, the quantity of pictures including a specific feature may be counted, whether the quantity is greater than a preset threshold P is determined, and when it is determined that the quantity of images including a specific feature is greater than the preset threshold P, it is determined that the video is a specific content video; otherwise, it is determined that the video is a normal video. In another embodiment, the quantity of picture including a specific feature may be counted, a ratio of the determined quantity of images including a specific feature to the total quantity of images extracted for the video detection is determined, and when the determined ratio is greater than a threshold Q, it is determined that the video is a specific content video, and step 1707 of processing the multimedia file is performed; otherwise, step 1708 of determining that the video is a normal video, and playing the multimedia file normally is performed.

A video determined as specific content may be further processed, for example, the video is classified, rated, or quit.

The foregoing method may be used to identify a porn video, and the feature detection for the video image includes sensitive position detection and skin color pixel detection.

An achievable method of the sensitive position detection includes:

Step 1. Search for feature data that is in a pre-stored human body sensitive position index and that corresponds to a human body sensitive position picture matching a to-be-identified image. The human body sensitive position index may orderly organize and store feature data of the human body sensitive position picture in a manner, to facilitate search. The human body sensitive position picture may be obtained by marking a human body sensitive position in a porn picture and generating a picture. The feature data may be a vector feature, and the vector feature may be any feature in an existing image identification method, such as description texture, HOG (Histogram of Oriented Gradient), or LBP (Local Binary Patterns). The feature data of the to-be-identified image may be extracted, and a distance between the feature data of the to-be-identified image and the feature data of the human body sensitive position picture may be calculated, so as to determine whether the to-be-identified picture matches the human body sensitive position picture according to the distance. For example, a Euclidean distance may be used to represent the distance, and if a Euclidean distance between the feature data of the to-be-identified image and the feature data of the human body sensitive position picture is the shortest, and the Euclidean distance is less than a Euclidean distance threshold, the to-be-identified image matches the human body sensitive position picture. It may be understood that, other similarity measures such as correlation coefficients may also be used to determine whether the to-be-identified image matches the human body sensitive position picture, and are not enumerated herein.

Step 2. Calculate, according to the matched feature data, a confidence corresponding to the to-be-identified image. The confidence is used to measure a function for determining a matching degree with an actual observed result. A higher confidence indicates a higher matching degree between the to-be-identified image and the human body sensitive position picture. In an embodiment, the Euclidean distance between the feature data of the to-be-identified image and the matched feature data and the confidence are in a relationship of a negative correlation, and a function of a negative correlation may be used to represent the relationship. For example, $c = e^{-x}$, where x is the Euclidean distance between the feature data of the to-be-identified image and the matched feature data, and c is the confidence.

Step 3. Determine whether the to-be-identified image is a porn image according to the confidence corresponding to the to-be-identified image. When the confidence is higher than a first confidence threshold, it indicates that the to-be-identified image highly matches the matched human body sensitive position picture, and the to-be-identified image is a porn image.

An achievable method of the skin color pixel detection includes:

Step 1. Detect human body area pixels and human head area pixels in a video image.

The human body detection generally uses an Adaboost (an iterative algorithm) human body detection algorithm (certainly, other algorithms may also be used), and whether a human body exists in the image is determined by using the Adaboost human body detection algorithm based on an edge histogram feature. An integral image of the video image is calculated first, the edge histogram feature is extracted, and according to a preset classifier feature base, a cascaded method is run to search for a human body area in the image. A classifier feature base training method includes: calculating an integral image of a sample image, and extracting a rectangle similar feature of the sample image; screening effective features according to the Adaboost algorithm, to form a weak classifier; and combining multiple weak classifiers to form a strong classifier; and cascading multiple strong classifiers to form a classifier feature base for human body detection. When the human body detection unit detects the human body, the video image is detected then, and whether a human head exists in the video image is determined.

The human head detection uses an Adaboost human head detection algorithm, and whether the human head exists in the image is determined by using the Adaboost human head detection algorithm based on the rectangle similar feature. An integral image of the image is calculated first, the edge histogram feature is extracted, and according to a trained classifier feature base, a cascaded method is run to search for a human head area in the image. A classifier feature base training method includes: calculating an integral image of a sample image, and extracting a rectangle similar feature of the sample image; screening effective features according to the Adaboost algorithm, to form a weak classifier; and combining multiple weak classifiers to form a strong classifier; and cascading multiple strong classifiers to form a classifier feature base for human head detection.

Step 2. Count a proportion of skin color pixels to image pixels, a proportion of skin color pixels to human body area pixels, and a proportion of human head area pixels to skin color pixels in each video image.

Step 3. Determine whether the video image is a porn image according to a preset first proportion threshold of skin color pixels and image pixels, a preset second proportion threshold of skin color pixels and human body area pixels, a preset third proportion threshold of human head area pixels and skin color pixels, and a preset determining policy.

First, whether the proportion of skin color pixels to image pixels is greater than the first proportion threshold, whether the proportion of skin color pixels to human body area pixels is greater than the second proportion threshold, and whether the proportion of human head area pixels to skin color pixels is greater than the third proportion threshold are determined to separately obtain a first result, a second result, and a third result; then, whether the first result, the second result, and the third result meet the determining policy is determined. If the first result, the second result, and the third result meet the determining policy, it indicates that the skin color pixels of the video image meet porn image features, it is determined that the video image is a porn image. The determining policy may meet at least one two conditions: the proportion of skin color pixels to image pixels is greater than the first proportion threshold, the proportion of skin color pixels to human body area pixels is greater than the second proportion threshold, and the proportion of human head area pixels to skin color pixels is greater than the third proportion threshold.

It should be noted that, for ease of description, the foregoing method embodiments are described as a series of action combinations. However, a person skilled in the art should understand that the embodiments are not limited to the described sequence of the actions, because some steps may be performed in another sequence or performed at the same time according to the embodiments. In addition, a person skilled in the art should also know that the embodiments described in this specification are all preferred embodiments; and therefore, an action and a module involved are not necessarily mandatory in the embodiments.

Based on the foregoing descriptions, a person skilled in the art may clearly understand that the method according to the foregoing embodiment may be implemented by software in addition to necessary universal hardware or certainly by hardware, but in most cases, the former one is the better implementation. Based on such an understanding, the technical solutions of the embodiments essentially or the part contributing to the related art technology may be implemented in a form of a software product. The computer software product is stored in a storage medium (such as a ROM/RAM, a magnetic disk, or an optical disc), and includes several instructions for instructing a terminal device (which may be a mobile phone, a personal computer, a server, a network device, or the like) to perform the methods described in the embodiments.

Figure 18:
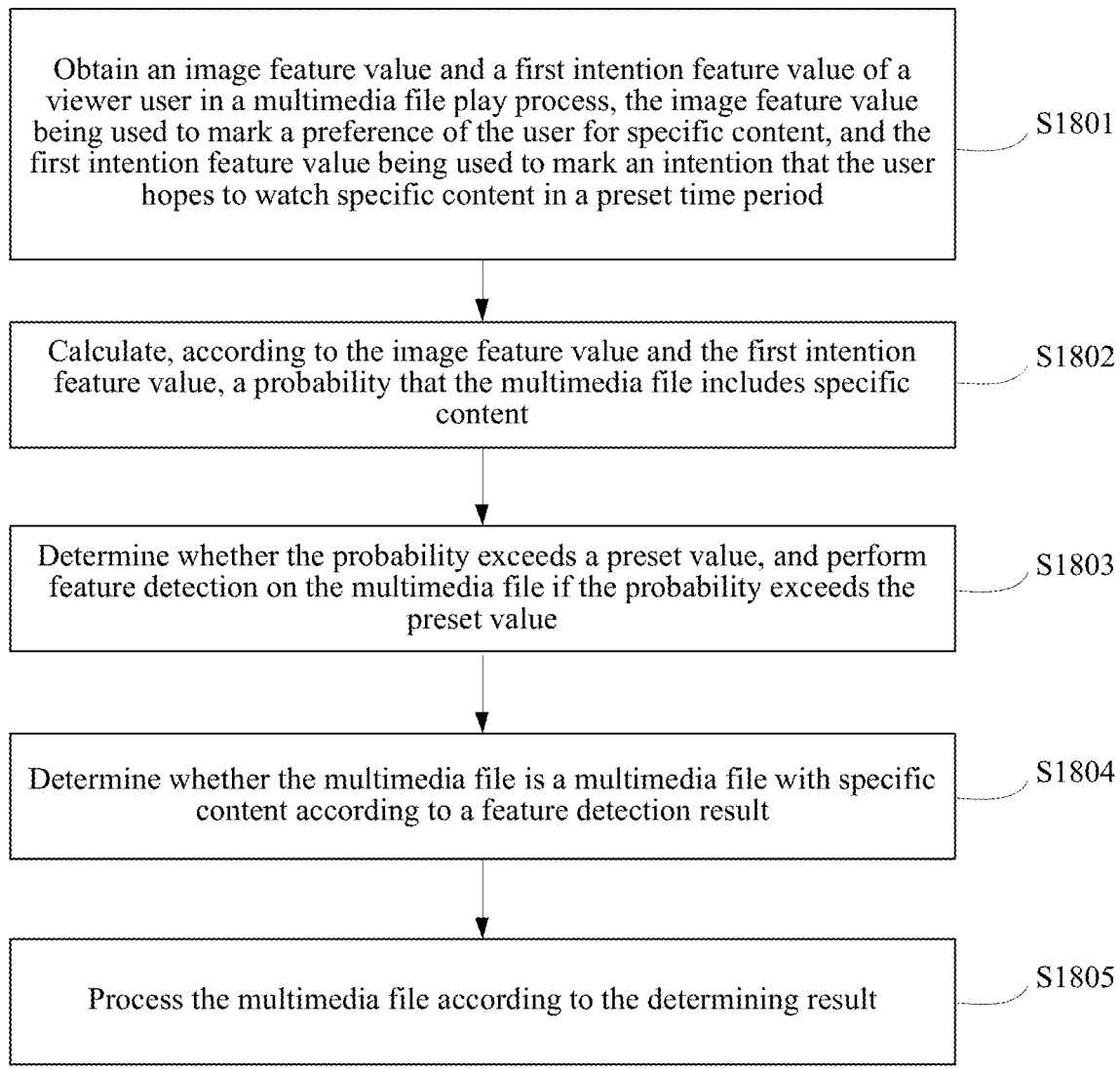
FIG. 18 is a flowchart of a multimedia file processing method according to an embodiment.

This embodiment provides a multimedia file processing method. In the running environment of the embodiments, this application provides a multimedia file processing method shown in FIG. 18. As shown in FIG. 18, FIG. 18 is a flowchart of a multimedia file processing method according to an embodiment. A solution of the method includes the following steps:

S1801. Obtain an image feature value and a first intention feature value of a viewer user in a multimedia file play process, the image feature value being used to mark a preference of the user for specific content, and the first intention feature value being used to mark an intention that the user hopes to watch specific content in a preset time period.

S1802. Calculate, according to the image feature value and the first intention feature value, a probability that the multimedia file includes specific content.

S1803. Determine whether the probability exceeds a preset value, and perform feature detection on the multimedia file if the probability exceeds the preset value.

S1804. Determine whether the multimedia file is a multimedia file with specific content according to a feature detection result.

S1805. Process the multimedia file according to the determining result.

The multimedia file is an on-demand video or a live video, and the specific content is porn content; and the processing the multimedia file according to the determining result includes: if the multimedia file is an on-demand porn video, quitting playing of the on-demand video; and if the multimedia file is a live porn video, closing a video live room in which the video is played.

In this embodiment, initial screening is performed on multimedia files by using a behavior feature of a user, and then specific content detection is performed on a multimedia file obtained through screening, thereby improving the identification efficiency and accuracy for the multimedia file with specific content. Applying this embodiment to detection of porn videos can greatly improve the detection efficiency and reliability and facilitate management and control of multimedia videos.

Figure 19:
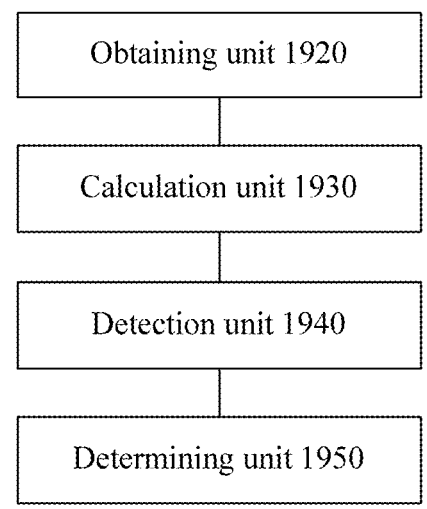
FIG. 19 is a schematic diagram of a multimedia file identification apparatus based on a behavior feature according to an embodiment.

This embodiment provides a multimedia file identification apparatus based on a behavior feature. As shown in FIG. 19, the apparatus includes an obtaining unit 1920, a calculation unit 1930, a detection unit 1940, and a determining unit 1950.

The obtaining unit 1920 is configured to obtain an image feature value and a first intention feature value of a viewer user in a multimedia file play process, the image feature value being used to mark a preference of the user for specific content, and the first intention feature value being used to mark an intention that the user hopes to watch specific content in a preset time period.

The calculation unit 1930 is configured to calculate, according to the image feature value and the first intention feature value, a probability that the multimedia file includes specific content.

The detection unit 1940 is configured to determine whether the probability exceeds a preset value, and perform feature detection on the multimedia file if the probability exceeds the preset value.

The determining unit 1950 is configured to determine whether the multimedia file is a multimedia file with specific content according to a feature detection result.

In the multimedia file identification apparatus based on a behavior feature of this embodiment, the obtaining unit 1920 is configured to perform step S1601 in the embodiments, the calculation unit 1930 is configured to perform step S1602 in the embodiments, the detection unit 1940 is configured to perform step S1603 in the embodiments, and the determining unit 1950 is configured to perform step S1604 in the embodiments.

Figure 20:
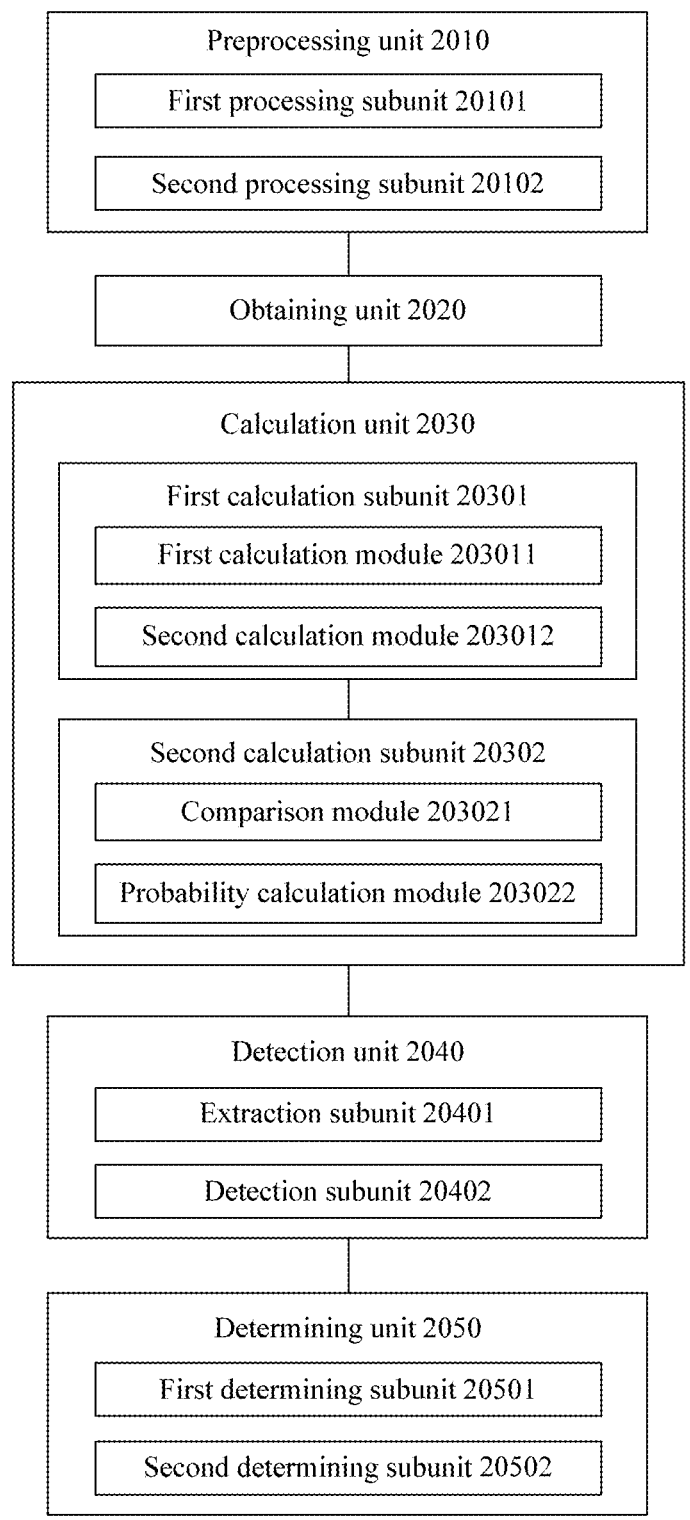
FIG. 20 is a schematic diagram of a multimedia file identification apparatus based on a behavior feature according to an embodiment.

Referring to FIG. 20 as an implementation, the calculation unit 2030 includes:

a first calculation subunit 20301, configured to determine a second intention feature value of each user according to the image feature value and the first intention feature value; and a second calculation subunit 20302, configured to calculate, according to second intention feature values of all users, the probability that the multimedia file includes specific content.

As an implementation, the first calculation subunit 20301 includes:

a first calculation module 203011, configured to add the image feature value and first intention feature value, to obtain the second intention feature value; and a second calculation module 203012, configured to perform weighted averaging on the image feature value and the first intention feature value according to weights preset for the image feature value and the first intention feature value, to obtain the second intention feature value.

Further, the second calculation subunit 20302 includes:

a comparison module 203021, configured to compare the second intention feature values of the users and a preset threshold separately; and a probability calculation module 203022, configured to calculate a ratio of the quantity of users with the second intention feature value exceeding the threshold to the total quantity of the users, to obtain the probability that the multimedia file includes specific content.

Further, the apparatus further includes a preprocessing unit 2010, and the preprocessing unit 2010 is configured to analyze behavior data of a user, and determine an image feature value and a first intention feature value of the user. The preprocessing unit 2010 includes a first preprocessing subunit 20101 and a second preprocessing subunit 20102.

The first processing subunit 20101 is configured to: obtain behavior data of the user, the behavior data including first behavior data for browsing a text related to specific content, second behavior data for browsing a picture related to specific content, third behavior data for accessing a forum related to specific content, and fourth behavior data for chatting in a chat group related to specific content; separately determine whether the first behavior data, the second behavior data, the third behavior data, and the fourth behavior data are empty, to obtain a first determining result, a second determining result, a third determining result, and a fourth determining result correspondingly; and perform allocation and integration on the first determining result, the second determining result, the third determining result, and the fourth determining result according to a preset first weight of the first determining result, a preset second weight of the second determining result, a preset third weight of the third determining result, and a fourth weight of the fourth determining result, to obtain a behavior feature value of the user.

The second processing subunit 20102 is configured to: obtain the behavior data of the user in a recent time period, the behavior data including a first time for browsing a text related to specific content, a second time for browsing a picture related to specific content, a third time for accessing a forum related to specific content, and a fourth time for chatting in a chat group related to specific content; and assign the first weight to the first time, assign the second weight to the second time, assign the third weight to the third time, assign the fourth weight to the fourth time, and perform weighted averaging on the first time, the second time, the third time, and the fourth time, to obtain an intention feature values of the user.

As an implementation, the multimedia file is a video, and the detection unit 2040 includes:

an extraction subunit 20401, configured to extract a preset quantity of images from the video at equal time intervals; and a detection subunit 20402, configured to perform feature detection on each image, and determine whether the image includes a specific feature, the feature detection including sensitive position detection and skin color pixel detection.

As an implementation, the determining unit 2050 includes:

a first determining subunit 20501, configured to: determine that the video is a specific content video when determining that the quantity of images including specific feature is greater than a preset threshold P; otherwise, determine that the video is a normal video; and a second determining subunit 20502, configured to determine a ratio of the determined quantity of images including a specific feature to the total quantity of images obtained through extraction by detecting the video, and determine that the video is a specific content video when determining that the ratio is greater than a threshold Q; otherwise, determine that the video is a normal video.

As an implementation, the specific content is porn content, and the video is an on-demand video or a live video.

Figure 21:
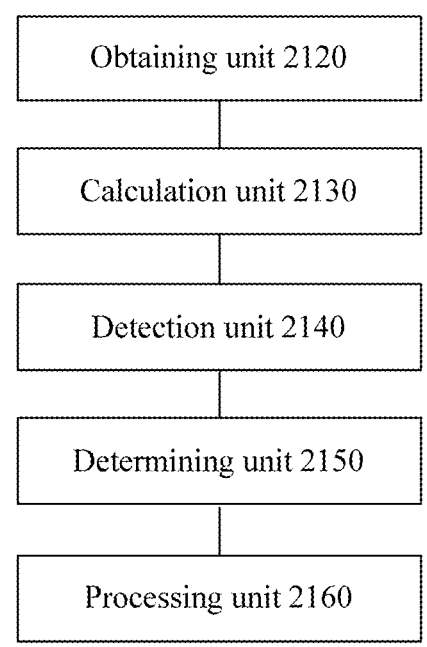
FIG. 21 is a schematic diagram of a multimedia file processing apparatus according to an embodiment.

This embodiment provides a multimedia file processing apparatus. As shown in FIG. 21, the apparatus includes an obtaining unit 2120, a calculation unit 2130, a detection unit 2140, a determining unit 2150, and a processing unit 2160.

The obtaining unit 2120 is configured to obtain an image feature value and a first intention feature value of a viewer user in a multimedia file play process, the image feature value being used to mark a preference of the user for specific content, and the first intention feature value being used to mark an intention that the user hopes to watch specific content in a preset time period.

The calculation unit 2130 is configured to calculate, according to the image feature value and the first intention feature value, a probability that the multimedia file includes specific content.

The detection unit 2140 is configured to determine whether the probability exceeds a preset value, and perform feature detection on the multimedia file if the probability exceeds the preset value.

The determining unit 2150 is configured to determine whether the multimedia file is a multimedia file with specific content according to a feature detection result.

The processing unit 2160 is configured to process the multimedia file according to the determining result.

In the multimedia file processing apparatus of the embodiment, the obtaining unit 2120 is configured to perform step S1801 in the embodiments, the calculation unit 2130 is configured to perform step S1802 in the embodiments, the detection unit 2140 is configured to perform step S1803 in the embodiments, the determining unit 2150 is configured to perform step S1804 in the embodiments, and the processing unit 2160 is configured to perform step S1805 in the embodiments.

The multimedia file is an on-demand video or a live video, and the specific content is porn content. The processing unit 2160 is specifically configured to: when determining that the multimedia file is an on-demand porn video, quit playing of the on-demand video; and when determining that the multimedia file is a live porn video, close a video live room in which the video is played.

This embodiment further provides a storage medium. In this embodiment, the foregoing storage medium may be used to store program code executed by the multimedia file identification method based on a behavior feature in the foregoing embodiment.

In this embodiment, the foregoing storage medium may be located in at least one of multiple network devices in a computer network.

In this embodiment, the storage medium is set to store program code used to execute the following steps:

First step. Obtain an image feature value and a first intention feature value of a viewer user in a multimedia file play process, the image feature value being used to mark a preference of the user for specific content, and the first intention feature value being used to mark an intention that the user hopes to watch specific content in a preset time period.

Second step. Calculate, according to the image feature value and the first intention feature value, a probability that the multimedia file includes specific content.

Third step. Determine whether the probability exceeds a preset value, and perform feature detection on the multimedia file if the probability exceeds the preset value.

Fourth step. Determine whether the multimedia file is a multimedia file with specific content according to a feature detection result.

The storage medium is further set to store program code used to perform the following steps: determining a second intention feature value of each user according to the image feature value and the first intention feature value; and calculating, according to second intention feature values of all users, the probability that the multimedia file includes specific content.

The storage medium is further set to store program code used to perform the following steps: adding the image feature value and the first intention feature value, to obtain the second intention feature value, or performing weighted averaging on the image feature value and the first intention feature value according to weights preset for the image feature value and the first intention feature value, to obtain the second intention feature value.

The storage medium is further set to store program code used to perform the following steps: comparing the second intention feature values of the users and a preset threshold separately; and calculating a ratio of the quantity of users with the second intention feature value exceeding the threshold to the total quantity of the users, to obtain the probability that the multimedia file includes specific content.

The storage medium is further set to store program code used to perform the following step: analyzing behavior data of a user, and determining an image feature value and a first intention feature value of the user.

The storage medium is further set to store program code used to perform the following steps: extracting a preset quantity of images from the video at equal time intervals when the multimedia file is a video; and performing feature detection on each image, and determining whether the image includes a specific feature, the feature detection including sensitive position detection and skin color pixel detection.

The storage medium is further set to store program code used to perform the following steps: determining that the video is a specific content video when determining that the quantity of images including specific feature is greater than a preset threshold P; otherwise, determining that the video is a normal video; or determining a ratio of the determined quantity of images including a specific feature to the total quantity of images obtained through extraction by detecting the video, and determining that the video is a specific content video when determining that the ratio is greater than a threshold Q; otherwise, determining that the video is a normal video.

In this embodiment, the foregoing storage medium may include but not limited to various media that may store program code, such as a USB flash disk, a ROM, a RAM, a removable hard disk, a magnetic disk, or an optical disc.

This embodiment further provides a storage medium. In this embodiment, the foregoing storage medium may be used to store program code executed by a video processing method in the foregoing embodiment.

In this embodiment, the foregoing storage medium may be located in at least one of multiple network devices in a computer network.

In this embodiment, the storage medium is set to store program code used to perform the following steps:

First step. Obtain an image feature value and a first intention feature value of a viewer user in a multimedia file play process, the image feature value being used to mark a preference of the user for specific content, and the first intention feature value being used to mark an intention that the user hopes to watch specific content in a preset time period.

Second step. Calculate, according to the image feature value and the first intention feature value, a probability that the multimedia file includes specific content.

Third step. Determine whether the probability exceeds a preset value, and perform feature detection on the multimedia file if the probability exceeds the preset value.

Fourth step. Determine whether the multimedia file is a multimedia file with specific content according to a feature detection result.

Fifth step. Process the multimedia file according to the determining result.

The storage medium is further set to store program code used to perform the following steps: if the multimedia file is an on-demand porn video, quitting playing of the on-demand video; and if the multimedia file is a live porn video, closing a video live room in which the video is played.

This embodiment further provides a computer terminal, and the computer terminal may be any computer terminal device in a computer terminal group. In this embodiment, the foregoing computer terminal may be replaced with a terminal device such as a mobile terminal.

In this embodiment, the foregoing computer terminal may be located in at least one of multiple network devices in a computer network.

Figure 22:
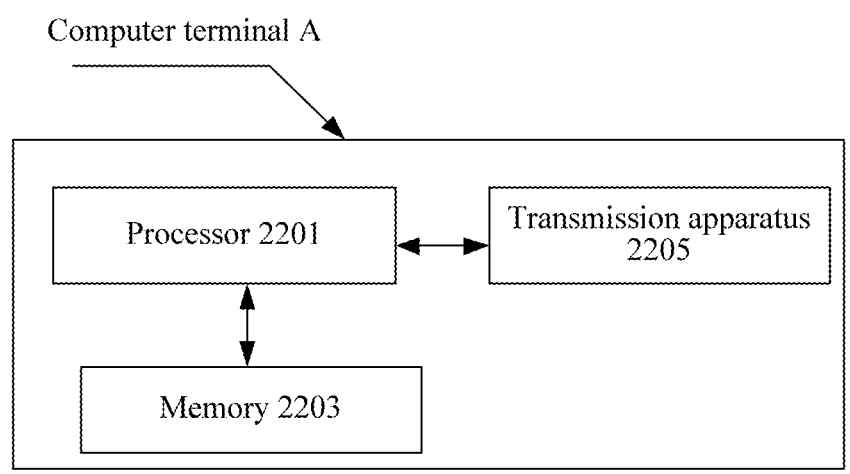
FIG. 22 is a structural block diagram of a computer terminal according to an embodiment.

FIG. 22 is a structural block diagram of a computer terminal according to an embodiment. As shown in FIG. 22, the computer terminal A may include: one or more (only one is shown in the figure) processors 2201, a memory 2203, and a transmission apparatus 2205.

The memory 2203 may be configured to store a software program and a module, for example, a program instruction/module corresponding to the multimedia file identification method and apparatus based on a behavior feature in the embodiments. The processor 2201 performs various functional applications and data processing by running the software program and the module stored in the memory 2203, that is, implementing the foregoing multimedia file identification method. The memory 2203 may include a high-speed random memory, and may also include a nonvolatile memory such as one or more magnetic storage devices, a flash memory, or another nonvolatile solid-state memory. In some instances, the memory 2203 may further include memories remotely disposed relative to the processor 2201, and these remote memories may be connected to the computer terminal A through a network. Instances of the network include, but are not limited to, the Internet, an intranet, a local area network, a mobile communications network, and a combination thereof.

The foregoing transmission apparatus 2205 is configured to receive or send data through a network. Specific instances of the foregoing network may include a wired network and a wireless network. In an instance, the transmission apparatus 2205 includes a network interface controller that may be connected to another network device and a router by using a network cable, thereby communicating with the Internet or a local area network. In an instance, the transmission apparatus 2205 is an RF module that is configured to communicate with the Internet in a wireless manner.

Specifically, the memory 2203 is configured to store information about a preset action condition and a preset privileged user, and an application program.

The processor 2201 may invoke, by using the transmission apparatus, the information and the application program stored in the memory 2203, so as to perform the following steps:

First step. Obtain an image feature value and a first intention feature value of a viewer user in a multimedia file play process, the image feature value being used to mark a preference of the user for specific content, and the first intention feature value being used to mark an intention that the user hopes to watch specific content in a preset time period.

Second step. Calculate, according to the image feature value and the first intention feature value, a probability that the multimedia file includes specific content.

Third step. Determine whether the probability exceeds a preset value, and perform feature detection on the multimedia file if the probability exceeds the preset value.

Fourth step. Determine whether the multimedia file is a multimedia file with specific content according to a feature detection result.

An embodiment of this application provides a network information identification method, and the method includes the following steps:

Step 1. Obtain to-be-identified network information.

In this step, the to-be-identified network information may include a target text.

Step 2. Perform word segmentation processing on the network information, to obtain words of the network information.

In this step, word segmentation processing may be performed on the target text, to obtain words of the target text.

Step 3. Determine information types of the words of the network information according to pre-stored trusted network information and non-trusted network information.

In this step, the trusted network information may be information in a real information base, and the non-trusted network information may be information in a false information base. The determining information types of the words of the network information according to pre-stored trusted network information and non-trusted network information may include: using neighboring two words as one phrase according to an occurrence order of the words in the network information, and determining an information type of each phrase according to the information in the false information base and the real information base.

In this step, an associated value of two words in each phrase may be calculated, an associated value of corresponding two words in the false information base is extracted as a first associated value; an associated value of corresponding two words in the real information base is extracted as a second associated value, a difference between the associated value and the first associated value is calculated to obtain a first difference; a difference between the associated value and the second associated value is calculated to obtain a second difference, an absolute value of the first difference and an absolute value of the second difference are compared, it is determined that an information type of the phrase is real information if the absolute value of the first difference is greater than the absolute value of the second difference, it is determined that the information type of the phrase is false information if the absolute value of the first difference is less than the absolute value of the second difference, and it is determined that the information type of the phrase is non-biased information if the absolute value of the first difference is equal to the absolute value of the second difference.

Step 4. Perform counting according to information types of all words, and determine an information type of the network information.

For a specific example in this embodiment, reference may be made to the foregoing embodiments and examples described in the embodiments, and details are not described herein again.

The sequence numbers of the foregoing embodiments are merely for description purpose but do not indicate the preference of the embodiments.

In the several embodiments provided in this application, it should be understood that the disclosed system, apparatus, and method may be implemented in other manners. For example, the foregoing described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms. The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit. If implemented in the form of software functional units and sold or used as an independent product, the integrated units may also be stored in a computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a personal computer, an apparatus, a network device, or the like) to perform all or some of the steps of the methods described in the embodiments. The foregoing storage medium includes: any medium that can store program code, such as a USB flash drive, a removable hard disk, a ROM, a RAM, a magnetic disk, or an optical disc.

The foregoing embodiments are merely provided for describing the technical solutions of the present disclosure, but not intended to limit the present disclosure. It should be understood by persons of ordinary skill in the art that although the present inventive concept has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. A method comprising:
   obtaining, by at least one processor, network information published on a social network;
   calculating, by the at least one processor, a first similarity between the network information and trusted network information, and calculating a second similarity between the network information and non-trusted network information;

determining, by the at least one processor, whether the network information is trusted information according to the first similarity and the second similarity; and when it is determined that the network information is trusted, allowing the network information to be displayed on the social network, and when it is determined that the network information is untrusted, automatically preventing the network information from being spread on the social network.

2. The method according to claim 1, wherein the first similarity is calculated using a first cosine law algorithm, and the second similarity is calculated using the cosine law algorithm.

3. The method according to claim 1, wherein the method further comprises:

collecting trusted network information and non-trusted network information; and establishing a trusted database according to the collected trusted network information, and establishing a non-trusted database according to the collected non-trusted network information.

4. The method according to claim 3, wherein a trusted similarity between the network information and each trusted network information in the trusted database are calculated to generate a plurality of trusted similarities, and a maximum value of the generated plurality of trusted similarities is taken as the first similarity; and a non-trusted similarity between the network information and each non-trusted network information in the non-trusted database are calculated to generate a plurality of non-trusted similarities, and a maximum value of the generated plurality of non-trusted similarities is taken as the second similarity.

5. The method according to claim 4, wherein the determining comprises:

comparing the first similarity and the second similarity;

determining that the network information is trusted when the first similarity is greater than the second similarity; and determining that the network information is untrusted when the second similarity is greater than the first similarity.

6. The method according to claim 5, wherein the preventing comprises marking the network information as suspicious, or blocking the network information from being displayed.

7. The method according to claim 1, wherein the preventing comprises marking the network information as suspicious, or blocking the network information from being displayed.

8. An apparatus comprising:

at least one memory configured to store computer program code; and at least one processor configured to access the at least one memory and operate according to the computer program code, the computer program code including:

obtaining code configured to cause at least one of the at least one processor to obtain network information published on a social network;

calculating code configured to cause at least one of the at least one processor to calculate a first similarity between the network information and trusted network information, and to calculate a second similarity between the network information and non-trusted network information;

determining code configured to cause at least one of the at least one processor to determine whether the network information is trusted information according to the first similarity and the second similarity; and controlling code configured to cause at least one of the at least one processor to, when it is determined that the network information is trusted, allow the network information to be displayed on the social network, and when it is determined that the network information is untrusted, automatically prevent the network information from being spread on the social network.

9. The apparatus according to claim 8, wherein the first similarity is calculated using a first cosine law algorithm, and the second similarity is calculated using the cosine law algorithm.

10. The apparatus according to claim 8, wherein the method further comprises:

collecting trusted network information and non-trusted network information; and establishing a trusted database according to the collected trusted network information, and establishing a non-trusted database according to the collected non-trusted network information.

11. The apparatus according to claim 10, wherein a trusted similarity between the network information and each trusted network information in the trusted database are calculated to generate a plurality of trusted similarities, and a maximum value of the generated plurality of trusted similarities is taken as the first similarity; and a non-trusted similarity between the network information and each non-trusted network information in the non-trusted database are calculated to generate a plurality of non-trusted similarities, and a maximum value of the generated plurality of non-trusted similarities is taken as the second similarity.

12. The apparatus according to claim 11, wherein the determining code further comprises:

comparing code configured to cause at least one of the at least one processor to compare the first similarity and the second similarity;

first determining subcode configured to cause at least one of the at least one processor to determine that the network information is trusted when the first similarity is greater than the second similarity; and second determining subcode configured to cause at least one of the at least one processor to determine that the network information is untrusted when the second similarity is greater than the first similarity.

13. The apparatus according to claim 12, wherein when the network information is determined to be untrusted, the network information is prevented from being spread by marking the network information as suspicious, or by blocking the network information from being displayed.

14. The apparatus according to claim 8, wherein when the network information is determined to be untrusted, the network information is prevented from being spread by marking the network information as suspicious, or by blocking the network information from being displayed.

15. A non-transitory computer readable storage medium, storing computer readable code which, when executed by at least one processor, performs:

obtaining network information published on a social network;

calculating a first similarity between the network information and trusted network information, and calculating a second similarity between the network information and non-trusted network information;

determining whether the network information is trusted information according to the first similarity and the second similarity; and when it is determined that the network information is trusted, allowing the network information to be displayed on the social network, and when it is determined that the network information is untrusted, automatically preventing the network information from being spread on the social network.

16. The non-transitory computer readable storage medium according to claim 15, wherein the first similarity is calculated using a first cosine law algorithm, and the second similarity is calculated using the cosine law algorithm.

17. The non-transitory computer readable storage medium according to claim 15, wherein the computer program code, when executed by the processor, further performs:

collecting trusted network information and non-trusted network information; and establishing a trusted database according to the collected trusted network information, and establishing a non-trusted database according to the collected non-trusted network information.

18. The non-transitory computer readable storage medium according to claim 17, wherein a trusted similarity between the network information and each trusted network information in the trusted database are calculated to generate a plurality of trusted similarities, and a maximum value of the generated plurality of trusted similarities is taken as the first similarity; and a non-trusted similarity between the network information and each non-trusted network information in the non-trusted database are calculated to generate a plurality of non-trusted similarities, and a maximum value of the generated plurality of non-trusted similarities is taken as the second similarity.

19. The non-transitory computer readable storage medium according to claim 18, wherein the determining comprises:

comparing the first similarity and the second similarity;

determining that the network information is trusted when the first similarity is greater than the second similarity; and determining that the network information is untrusted when the second similarity is greater than the first similarity.

20. The method according to claim 19, wherein the preventing comprises marking the network information as suspicious, or blocking the network information from being displayed.

* * * * *